(12) United States Patent
Kitagawa et al.

(10) Patent No.: US 8,274,624 B2
(45) Date of Patent: Sep. 25, 2012

(54) LIQUID CRYSTAL PANEL AND LIQUID CRYSTAL DISPLAY

(75) Inventors: Takeharu Kitagawa, Ibaraki (JP); Daisuke Hayashi, Ibaraki (JP); Hideki Ishida, Ibaraki (JP); Takeshi Nishibe, Ibaraki (JP); Nao Murakami, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 389 days.

(21) Appl. No.: 12/602,604

(22) PCT Filed: May 27, 2008

(86) PCT No.: PCT/JP2008/059683
§ 371 (c)(1),
(2), (4) Date: Dec. 1, 2009

(87) PCT Pub. No.: WO2008/155978
PCT Pub. Date: Dec. 24, 2008

(65) Prior Publication Data
US 2010/0165264 A1 Jul. 1, 2010

(30) Foreign Application Priority Data

Jun. 18, 2007 (JP) ................................. 2007-159774
Sep. 5, 2007 (JP) ................................. 2007-230300

(51) Int. Cl.
*G02F 1/1335* (2006.01)
(52) U.S. Cl. .......... 349/96; 349/117; 349/118; 349/119; 349/120
(58) Field of Classification Search ............... 349/96, 349/117–120
See application file for complete search history.

(56) References Cited

U.S. PATENT DOCUMENTS

| 4,889,412 A | 12/1989 | Clerc et al. |
| 5,298,199 A | 3/1994 | Hirose et al. |
| 5,344,916 A | 9/1994 | Harris et al. |

(Continued)

FOREIGN PATENT DOCUMENTS

JE 10-221684 A 8/1998

(Continued)

OTHER PUBLICATIONS

International Search Report of PCT/JP2008/059683, mailing date of Aug. 19, 2008.

(Continued)

*Primary Examiner* — Huyen Ngo
(74) *Attorney, Agent, or Firm* — Westerman, Hattori, Daniels & Adrian, LLP

(57) ABSTRACT

The present invention provides a liquid crystal panel that can provide a neutral display that is free from coloring in every direction. The liquid crystal panel includes a first polarizer 14a, a second polarizer 14b, and a liquid crystal cell 13. The first polarizer 14a is arranged on the visible side of the liquid crystal cell 13 and the second polarizer 14b is arranged on the backlight side of the liquid crystal cell 13. The liquid crystal panel further includes a first retardation layer 11 and a second retardation layer 12. A refractive index ellipsoid of the first retardation layer 11 has a relationship of nx=ny>nz, and a refractive index ellipsoid of the second retardation layer 12 has a relationship of nx>ny≧nz. The first retardation layer 11 and the second retardation layer 12 are arranged between the liquid crystal cell 13 and the second polarizer 14b.

18 Claims, 3 Drawing Sheets

U.S. PATENT DOCUMENTS

| | | | |
|---|---|---|---|
| 6,124,906 A * | 9/2000 | Kawada et al. | 349/65 |
| 6,281,956 B1 * | 8/2001 | Ohmuro et al. | 349/118 |
| 6,503,581 B1 | 1/2003 | Shibue et al. | |
| 6,623,811 B2 | 9/2003 | Shibue et al. | |
| 6,661,488 B1 | 12/2003 | Takeda et al. | |
| 6,724,452 B1 | 4/2004 | Takeda et al. | |
| 6,740,370 B2 | 5/2004 | Shibue et al. | |
| 7,012,663 B2 | 3/2006 | Ono et al. | |
| 7,167,224 B1 | 1/2007 | Takeda et al. | |
| 7,208,205 B2 | 4/2007 | Shibue et al. | |
| 7,224,421 B1 | 5/2007 | Takeda et al. | |
| 7,227,606 B2 | 6/2007 | Takeda et al. | |
| 7,235,283 B2 | 6/2007 | Adachi et al. | |
| 7,270,855 B2 | 9/2007 | Yamaoka et al. | |
| 7,304,703 B1 | 12/2007 | Takeda et al. | |
| 7,403,248 B2 | 7/2008 | Uchida et al. | |
| 7,435,458 B2 | 10/2008 | Shibue et al. | |
| 7,463,320 B2 | 12/2008 | Kobayashi et al. | |
| 2003/0169391 A1 | 9/2003 | Uchida et al. | |
| 2005/0099562 A1 | 5/2005 | Nishikouji et al. | |
| 2006/0055845 A1 * | 3/2006 | Hisatake | 349/98 |
| 2006/0061725 A1 * | 3/2006 | Chiu et al. | 349/187 |
| 2006/0114383 A1 * | 6/2006 | Kobayashi et al. | 349/117 |
| 2006/0227423 A1 | 10/2006 | Saiki et al. | |
| 2007/0024792 A1 | 2/2007 | Chang et al. | |
| 2007/0064187 A1 | 3/2007 | Takeda et al. | |
| 2007/0273816 A1 * | 11/2007 | Kitagawa et al. | 349/118 |
| 2008/0165314 A1 | 7/2008 | Takeda et al. | |
| 2008/0303997 A1 | 12/2008 | Takeda et al. | |
| 2009/0002616 A1 | 1/2009 | Shibue et al. | |
| 2009/0046228 A1 | 2/2009 | Takeda et al. | |
| 2009/0207360 A1 | 8/2009 | Takeda et al. | |
| 2009/0231519 A1 * | 9/2009 | Toyama et al. | 349/96 |
| 2009/0231528 A1 | 9/2009 | Nakano et al. | |

FOREIGN PATENT DOCUMENTS

| | | |
|---|---|---|
| JP | 61-292601 A | 12/1986 |
| JP | 62-210423 A | 9/1987 |
| JP | 1-238621 A | 9/1989 |
| JP | 04-153621 A | 5/1992 |
| JP | 07-112446 A | 5/1995 |
| JP | 7-318925 A | 12/1995 |
| JP | 09-117983 A | 5/1997 |
| JP | 11-098208 A | 4/1999 |
| JP | 11-116780 A | 4/1999 |
| JP | 11-258605 A | 9/1999 |
| JP | 2000-180844 A | 6/2000 |
| JP | 2001-188128 A | 7/2001 |
| JP | 2001-315144 A | 11/2001 |
| JP | 2001-350017 A | 12/2001 |
| JP | 2003-262869 A | 9/2003 |
| JP | 2003-287623 A | 10/2003 |
| JP | 2003-31555 A | 11/2003 |
| JP | 2004-198952 A | 7/2004 |
| JP | 2004-341503 A | 12/2004 |
| JP | 3648240 B2 | 5/2005 |
| JP | 2006-178401 A | 7/2006 |
| JP | 2007-148016 A | 6/2007 |
| WO | 2007/055109 A1 | 5/2007 |

OTHER PUBLICATIONS

Korean Office Action dated Sep. 27, 2011, issued in corresponding Korean Patent Application No. 2010-700218, with English Translation.

Taiwanese Office Action dated Apr. 2, 2012, issued in corresponding Taiwanese Patent Application No. 097120244. W/ Partial English Translation.

Japanese Office Action dated May 7, 2012, issued in corresponding application No. 2007-230300, with partial translation.

* cited by examiner

LIQUID CRYSTAL PANEL AND LIQUID CRYSTAL DISPLAY

TECHNICAL FIELD

The present invention relates to a liquid crystal panel and a liquid crystal display.

BACKGROUND ART

Liquid crystal displays (LCDs) are devices that display characters and images utilizing electro-optical characteristics of liquid crystal molecules, and they have been used widely in mobile phones, notebook computers, liquid crystal televisions, etc. In a LCD, a liquid crystal panel having a polarizing plate arranged on each side of a liquid crystal cell generally is used. For example, in a normally black type LCD, a black display can be obtained when no voltage is applied thereto (see Patent Document 1, for example). An example of the configuration of a conventional liquid crystal panel is shown in the schematic sectional view of FIG. 4. As shown in FIG. 4, polarizing plates 17 are arranged on both sides of a liquid crystal cell 13 with a retardation layer 18 intervening between the liquid crystal cell 13 and each of the polarizing plates. An example of the configuration of the liquid crystal cell is shown in the schematic sectional view of FIG. 5. As shown in FIG. 5, the liquid crystal cell 13 is configured so that spacers 132 are arranged between a pair of substrates 131, and a liquid crystal layer 133 is held in a space that is formed between the pair of substrates 131 by the spacers 132. Although not shown in the drawing, one of the substrates is provided with a switching element (e.g., TFT) for controlling electro-optical characteristics of the liquid crystal, a scanning line for supplying gate signals to the switching element, and a signal line for supplying source signals to the switching element. The retardation layer is also called as the "birefringence layer" or "optical compensation layer". The retardation layer is used for optical compensation such as, for example, improvement of viewing angle characteristics, color shift, and the contrast of a liquid crystal display. As shown in FIG. 4, in the conventional liquid crystal panel, the retardation layers are arranged on both the visible side (the upper side in the drawing) and the backlight side (the lower side in the drawing) (Patent Document 2).

On the other hand, accompanying the increase in resolution and performance enhancement of liquid crystal displays in recent years, uniformity in a display screen and improvement in display quality have been required. More specifically, there has been a demand for a liquid crystal panel capable of providing a neutral display that is free from coloring in every direction. However, with conventional liquid crystal panels, it is difficult to provide a neutral display that is free from coloring in every direction.

[Patent Document 1] Japanese Patent No. 3648240
[Patent Document 2] JP 11 (1999)-95208 A

DISCLOSURE OF INVENTION

With the foregoing in mind, it is an object of the present invention to provide a liquid crystal panel and a liquid crystal display that are capable of providing a neutral display that is free from coloring in every direction.

In order to achieve the above object, a liquid crystal panel according to the present invention includes a first polarizer, a second polarizer, and a liquid crystal cell. The first polarizer is arranged on a visible side of the liquid crystal cell and the second polarizer is arranged on a backlight side of the liquid crystal cell. The liquid crystal panel further includes a first retardation layer and a second retardation layer. A refractive index ellipsoid of the first retardation layer has a relationship of $nx=ny>nz$, and a refractive index ellipsoid of the second retardation layer has a relationship of $nx>ny \geqq nz$. The first retardation layer and the second retardation layer are arranged between the liquid crystal cell and the second polarizer.

A liquid crystal display according to the present invention includes a liquid crystal display, which is the liquid crystal panel according to the present invention.

In the liquid crystal panel of the present invention, the first retardation layer whose refractive index ellipsoid has a relationship of $nx=ny>nz$ and the second retardation layer whose refractive index ellipsoid has a relationship of $nx>ny \geqq nz$ are arranged on the backlight side of the liquid crystal cell. With this configuration, the liquid crystal panel of the present invention can provide a neutral display that is free from coloring in every direction. Thus, a liquid crystal display using the liquid crystal panel of the present invention can provide a uniform display on the screen and also can provide a high quality display.

DESCRIPTION OF THE INVENTION

Figure 1:
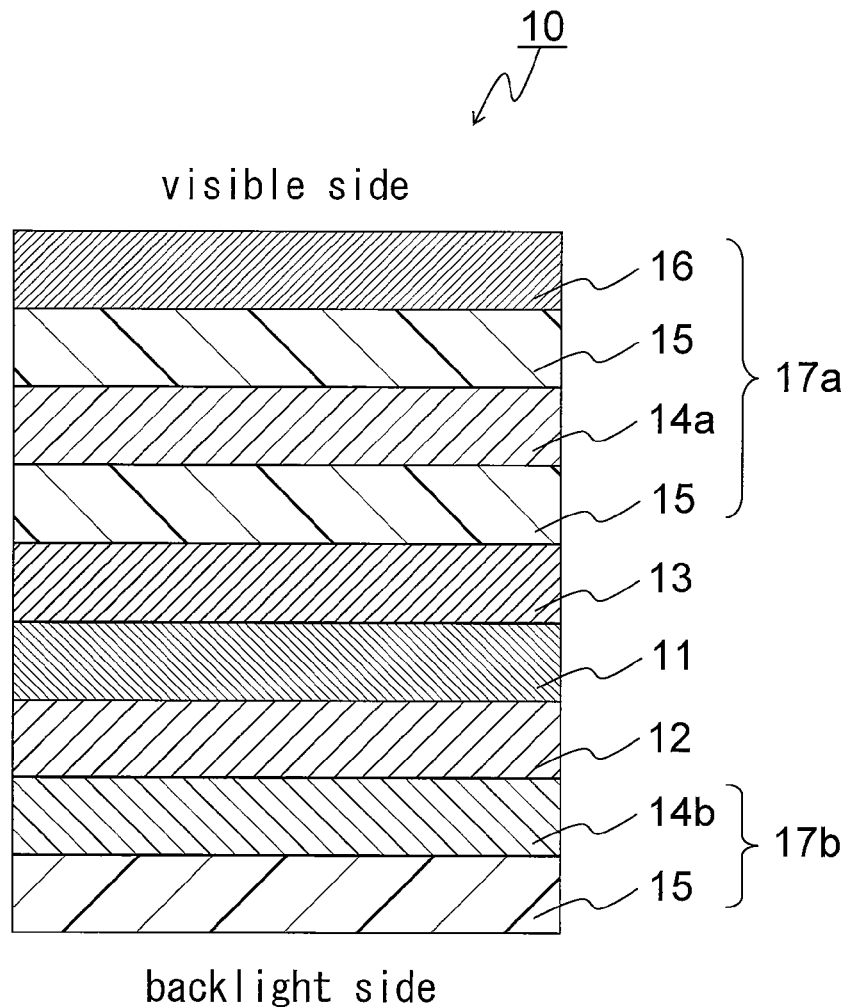
FIG. 1 is a schematic sectional view showing an example of the configuration of a liquid crystal panel of the present invention.

In the present invention, a transmittance (T) of the polarizer is a Y value whose luminous factor has been corrected in view of a two-degree visual field (C light source) according to JIS Z 8701 (1982 version) and can be measured by the method described later in the examples, for instance.

In the present invention, a refractive index "nx" denotes a refractive index in a direction (a slow axis direction) in which a refractive index within a plane of the liquid crystal cell or the retardation layer reaches its maximum, a refractive index "ny" denotes a refractive index in a direction (a fast axis direction) that is orthogonal to the nx direction within the plane of the liquid crystal cell or the retardation layer, and a refractive index "nz" denotes a refractive index in the thickness direction of the liquid crystal cell or the retardation layer, which is orthogonal to each of the nx and ny directions.

In the present invention, a retardation value ($Re[\lambda]$) within a plane of the retardation layer denotes a retardation value within the plane of the retardation layer at a wavelength $\lambda$ (nm) at 23° C., for instance. $Re[\lambda]$ is calculated based on an equation: $Re[\lambda]=(nx-ny) \times d$, where d (nm) is the thickness of the retardation layer. $Re[\lambda]$ can be measured by the method described later in the examples, for instance.

In the present invention, a retardation value ($Rth[\lambda]$) in the thickness direction of the liquid crystal cell or the retardation layer denotes a retardation value in the thickness direction of the liquid crystal cell or the retardation layer at a wavelength of λ (nm) at 23° C., for instance. $Rth[\lambda]$ is calculated based on an equation: $Rth[\lambda]=(nx-nz)\times d$, where d (nm) is the thickness of the liquid crystal cell or the retardation layer. $Rth[\lambda]$ can be measured by the method described later in the examples, for instance.

In the present invention, a birefringence ($\Delta n_{xz}[\lambda]$) in the thickness direction of the retardation layer is a value obtained by calculation based on an equation: $\Delta n_{xz}[\lambda]=Rth[\lambda]/d$, where d (nm) is the thickness of the retardation layer. $Rth[\lambda]$ is as described above.

In the present invention, an Nz coefficient is a value obtained by calculation based on an equation: Nz coefficient=$Rth[\lambda]/Re[\lambda]$. λ can be set to 590 nm, for instance.

In the present invention, "nx=ny" or "ny=nz" not only means that they are completely the same, but also encompasses the case where they are substantially the same. Therefore, for example, when it is described that nx=ny, it encompasses the case where Re[590] is less than 10 nm.

In the present invention, the term "orthogonal" also encompasses the case of "substantially orthogonal", which means, for example, the deviation is within the range from 90°±2°, preferably from 90°±1°. Also, in the present invention, the term "parallel" also encompasses the case of "substantially parallel", which means, for example, the deviation is within the range from 0°±2°, preferably from 0°±1°.

In the liquid crystal panel of the present invention, it is preferable that the transmittance ($T_2$) of the second polarizer is greater than the transmittance ($T_1$) of the first polarizer. When $T_2$ is greater than $T_1$, it is possible to obtain a liquid crystal panel having a high contrast ratio in the front direction.

In the liquid crystal panel of the present invention, it is preferable that the difference ($\Delta T=T_2-T_1$) between the transmittance ($T_2$) of the second polarizer and the transmittance ($T_1$) of the first polarizer is in the range from 0.1% to 6.0%. By using two polarizers having the transmittance difference in the above-described range, it is possible to obtain a liquid crystal panel having a still higher contrast ratio in the front direction.

In the liquid crystal panel of the present invention, it is preferable that the transmittance ($T_1$) of the first polarizer is in the range from 38.3% to 43.3% and the transmittance ($T_2$) of the second polarizer is in the range from 41.1% to 44.3%. By setting $T_1$ and $T_2$ in the above-described range, it is possible to obtain a liquid crystal panel having a still higher contrast ratio in the front direction.

In the liquid crystal panel of the present invention, it is preferable that the polarization ratio of at least one of the first polarizer and the second polarizer is at least 99%. By setting the polarization ratio to at least 99%, it is possible to obtain a liquid crystal panel having a still higher contrast ratio in the front direction.

In the liquid crystal panel of the present invention, it is preferable that at least one of the first polarizer and the second polarizer contains a polyvinyl alcohol resin containing iodine.

In the liquid crystal panel of the present invention, it is preferable that the difference ($\Delta I=I_1-I_2$) between an iodine content ($I_1$) in the first polarizer and an iodine content ($I_2$) in the second polarizer is in a range from 0.1 to 2.6 wt %. By setting the relationship between the iodine contents in the respective polarizers in the above-described range, it is possible to obtain the polarizers having the relationship between the transmittances is in a more preferable range. As a result, it is possible to obtain a liquid crystal panel having a still higher contrast ratio in the front direction.

In the liquid crystal panel of the present invention, it is preferable that at least one of the iodine content ($I_1$) in the first polarizer and the iodine content ($I_2$) in the second polarizer is in the range from 1.8 to 5.0 wt %. By setting the iodine contents in the respective polarizers in the above-described range, it is possible to obtain the polarizers whose transmittance is in a more preferable range. As a result, it is possible to obtain a liquid crystal panel having a still higher contrast ratio in the front direction.

In the liquid crystal panel of the present invention, it is preferable that a slow axis of the first retardation layer is orthogonal to an absorption axis of the first polarizer. Generally, the first polarizer is produced by stretching a material for forming the first polarizer in the longitudinal direction between a plurality of rolls. On the other hand, the first retardation layer is produced by, for example, subjecting a material for forming the first retardation layer to transverse uniaxial stretching. Therefore, when the slow axis of the first retardation layer and the absorption axis of the first polarizer are in a relationship such that they are orthogonal to each other, it becomes possible to carry out the lamination of the first retardation layer and the first polarizer successively in the same direction by roll-to-roll processing, resulting in improved manufacturing efficiency.

In the liquid crystal panel of the present invention, it is preferable that the first retardation layer and the second retardation layer are arranged in this order from the visible side toward the backlight side.

In the liquid crystal panel of the present invention, it is preferable that, in lamination of the second polarizer and the second retardation layer, the second polarizer and the second retardation layer are laminated via an adhesive layer.

In the liquid crystal panel of the present invention, it is preferable that the adhesive layer contains a water-soluble adhesive containing a polyvinyl alcohol resin.

In the liquid crystal panel of the present invention, it is preferable that the water-soluble adhesive containing the polyvinyl alcohol resin further contains a metal compound colloid.

In the liquid crystal panel of the present invention, it is preferable that a retardation value ($Rth_1[590]$) of the first retardation layer in the thickness direction at a wavelength of 590 nm is in the range from 100 to 400 nm. By setting $Rth_1[590]$ in the above-described range, it is possible to obtain a liquid crystal panel having a still higher contrast ratio in the front direction.

In the liquid crystal panel of the present invention, it is preferable that the first retardation layer is any one of a retardation film (B1) containing a polyimide resin, a retardation film (B2) containing a cellulose resin, and a laminate (C) of the retardation film (B1) and the retardation film (B2).

In the liquid crystal panel of the present invention, it is preferable that a retardation value ($Re_2[590]$) within a plane of the second retardation layer at a wavelength of 590 nm is in the range from 50 to 200 nm. By setting $Re_2[590]$ in the above-described range, it is possible to obtain a liquid crystal panel having a still higher contrast ratio in the front direction.

In the liquid crystal panel of the present invention, it is preferable that the second retardation layer is a retardation film (A) containing a norbornene resin.

In the liquid crystal panel of the present invention, it is preferable that the liquid crystal cell contains liquid crystal molecules that are in homeotropic alignment.

In the following, the present invention will be described in detail.

[A. Liquid Crystal Panel of the Present Invention]

An example of the configuration of a liquid crystal panel according to the present invention is shown in the schematic sectional view of FIG. 1. In FIG. 1, the sizes, proportions, etc. of the respective components are different from the actual sizes, proportions, etc. for the sake of simplicity in illustration. As shown in FIG. 1, this liquid crystal panel 10 includes a first polarizer 14a, a second polarizer 14b, a liquid crystal cell 13, a first retardation layer 11, and a second retardation layer 12 as main components. The first polarizer 14a is arranged on the visible side of the liquid crystal cell 13. The second polarizer 14b is arranged on the backlight side of the liquid crystal cell 13. The refractive index ellipsoid of the first retardation layer has a relationship of nx=ny>nz. The refractive index ellipsoid of the second retardation layer has a relationship of nx>ny≧nz. The first retardation layer 11 and the second retardation layer 12 are arranged between the liquid crystal cell 13 and the second polarizer 14b. In this example, the first retardation layer 11 and the second retardation layer 12 are arranged in this order from the visible side toward the backlight side. The first retardation layer 11 and the second retardation layer 12 also serve as protective layers. Protective layers 15 are laminated on the visible side and backlight side of the first polarizer 14a, respectively. On the side opposite to the first polarizer 14a side (i.e., on the visible side) of the protective layer 15 provided on the visible side, a surface-treated layer 16 is laminated. The protective layer 15 on the backlight side, the first polarizer 14a, the protective layer 15 on the visible side, and the surface-treated layer 16 constitute a first polarizing plate 17a. Another protective layer 15 is laminated on the backlight side of the second polarizer 14b. The second polarizer 14b and the protective layer 15 constitute a second polarizing plate 17b. Note here that, in the liquid crystal panel of the present invention, the protective layers and the surface-treated layer are components that may be provided optionally. In the liquid crystal panel of the present invention, the protective layers and the surface-treated layer may not be provided, but it is preferable to provide them. As described above, the liquid crystal panel 10 of the present example has the first retardation layer 11 and the second retardation layer 12 and thus can provide a neutral display that is free from coloring in every direction. In the present invention, the planar shape of the liquid crystal cell is a four-sided shape with 90° corners, which may be either square or rectangular. However, a rectangular shape is preferable. Furthermore, in the present invention, the planar shape of each of the components such as the polarizers, the retardation layers, and the protective layers preferably is a four-sided shape with 90° corners, which may be either square or rectangular. However, a rectangular shape corresponding to the planar shape of the liquid crystal cell is preferable.

As described above, it is preferable that the transmittance ($T_2$) of the second polarizer is greater than the transmittance ($T_1$) of the first polarizer. When $T_2$ is greater than $T_1$, it is possible to obtain a liquid crystal panel having a high contrast ratio in the front direction.

As described above, it is preferable that the difference ($\Delta T=T_2-T_1$) between the transmittance ($T_2$) of the second polarizer and the transmittance ($T_1$) of the first polarizer is in the range from 0.1% to 6.0%. By using two polarizers having the transmittance difference in the above-described range, it is possible to obtain a liquid crystal panel having a still higher contrast ratio in the front direction. It is more preferable that the difference ($\Delta T=T_2-T_1$) is in the range from 0.1% to 5.0%, still more preferably from 0.2% to 4.5%, and particularly preferably from 0.3% to 4.0%.

Between the respective components (the optical elements) of the liquid crystal panel, an adhesive layer (not shown) or an optical element (preferably, the one exhibiting isotropy) may be arranged optionally. The "adhesive layer" refers to a layer that joins the surfaces of adjacent optical elements and integrates them with a practically sufficient adhesion strength within a practically acceptable adhesion time. Examples of the material for forming the adhesive layer include conventionally known adhesives, pressure-sensitive adhesives, and anchor coating agents. The adhesive layer may have a multilayer structure in which an anchor coating layer is formed on a surface of a substance to be joined and an adhesive layer is formed on the anchor coating layer. Furthermore, the adhesive layer may be a thin layer (also referred to as a hairline) that cannot be recognized with the naked eye.

[B. Liquid Crystal Cell]

As the liquid crystal cell, an active-matrix type liquid crystal cell using a thin film transistor can be used, for example. Furthermore, as the liquid crystal cell, a simple-matrix type liquid crystal cell as used in a super-twisted nematic liquid crystal display or the like also can be used.

Figure 5:
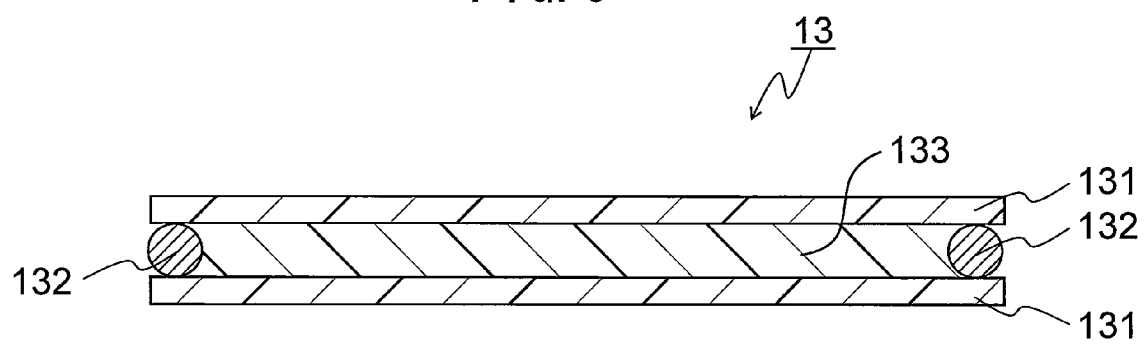
FIG. 5 is a schematic sectional view showing an example of the configuration of a liquid crystal cell.

Generally, the liquid crystal cell is configured so that a liquid crystal layer is held between a pair of substrates. FIG. 5 shows an example of the configuration of a liquid crystal cell. As shown in FIG. 5, in a liquid crystal cell 13 of the present example, spacers 132 are arranged between a pair of substrates 131 to form a space, and a liquid crystal layer 133 is held in this space. Although not shown in the drawing, for example, one substrate (an active matrix substrate) included in the pair of substrates is provided with a switching element (e.g., a TFT) for controlling the electro-optical characteristics of the liquid crystal and a scanning line for supplying gate signals and a signal line for transmitting source signals to this active element. The other substrate included in the pair of substrates is provided with, for example, a color filter.

The color filter may be provided in the active matrix substrate. The color filter may be omitted when the liquid crystal display includes light sources of three colors, namely, RGB (the liquid crystal display may include light sources for more than three colors) as illuminating means as in the case of a field sequential system, for example. The distance between the pair of substrates (i.e., the cell gap) is controlled by a spacer, for example. The cell gap is in the range from 1.0 to 7.0 μm, for example. On the side of each substrate that is in contact with the liquid crystal layer, an alignment film formed of, e.g., polyimide is provided. The alignment film may be omitted when initial alignment of the liquid crystal molecules is controlled by utilizing a fringe electric field generated by a patterned transparent substrate, for example.

It is preferable that the refractive index ellipsoid of the liquid crystal cell has the relationship of nz>nx=ny. Examples of the liquid crystal cell with a refractive index ellipsoid having the relationship of nz>nx=ny include, according to the classification based on the driving mode of the liquid crystal cell, liquid crystal cells of vertical alignment (VA) mode, twisted nematic (TN) mode, vertical-aligned electrically controlled birefringence (ECB) mode, and optically compensated birefringence (OCB) mode. In the present invention, it is particularly preferable that the driving mode of the liquid crystal cell is the VA mode.

$Rth_{LC}[590]$ of the liquid crystal cell in the absence of an electric field preferably is in the range from −500 to −200 nm, more preferably from −400 to −200 nm. $Rth_{LC}[590]$ is set as appropriate by adjusting the birefringence of the liquid crystal molecules and the cell gap, for example.

In the VA mode liquid crystal cell, liquid crystal molecules that are in homeotropic alignment are caused to respond to an electric field that is normal to the substrate by utilizing a voltage control birefringence effect in the absence of an electric field. Specifically, as described in, e.g., JP 62 (1987)-210423 A and JP 4 (1992)-153621 A, in the case of a normally black-type liquid crystal cell, liquid crystal molecules are aligned in the normal direction with respect to the substrate in the absence of an electric field. Thus, black display can be obtained by causing the alignments in the polarizing plates provided on upper and lower sides to be orthogonal to each other. On the other hand, in the presence of an electric field, the liquid crystal molecules operate so as to incline toward 45° direction with respect to the absorption axis of the polarizing plate. Thus, the transmittance becomes greater, so that white display can be obtained.

The VA-mode liquid crystal cell may have a multi-domain structure by forming a slit in an electrode or by using a base having a projection on its surface, as described in JP 11(1999)-258605 A, for example. Examples of such a liquid crystal cell include "ASV (ADVANCED SUPER VIEW) mode (trade name)" manufactured by Sharp Corporation, "CPA (CONTINUOUS PINWHEEL ALIGNMENT) mode (trade name)" manufactured by Sharp Corporation, "MVA (MULTI-DOMAIN VERTICAL ALIGNMENT) mode (trade name)" manufactured by Fujitsu Ltd., "PVA (PATTERNED VERTICAL ALIGNMENT) mode (trade name)" manufactured by Samsung Electronics, "EVA (ENHANCED VERTICAL ALIGNMENT) mode (trade name)" manufactured by Samsung Electronics, and "SURVIVAL (SUPER RANGED VIEWING VERTICAL ALIGNMENT) mode (trade name)" manufactured by Sanyo Electric Co., Ltd.

As the liquid crystal cell, it is possible to use a liquid crystal cell equipped in a commercially available liquid crystal display as it is, for example. Examples of a commercially available liquid crystal display including the VA mode liquid crystal cell include liquid crystal televisions "AQUOS series (trade name)" manufactured by Sharp Corporation, liquid crystal televisions "BRAVIA series (trade name)" manufactured by Sony Corp., a 32V-type wide-screen liquid crystal television "LN32R51B (trade name)" manufactured by SAMSUNG, a liquid crystal television "FORIS SC26XD1 (trade name)" manufactured by Eizo Nanao Corp., and a liquid crystal television "T460HW01 (trade name)" manufactured by AU Optronics.

[C. Polarizing Plate]

It is preferable that the first polarizing plate and the second polarizing plate are arranged so that their absorption axes are orthogonal to each other. Each of the first polarizing plate and the second polarizing plate includes a polarizer and optionally a protective layer. It is to be noted that other optical elements such as the first retardation layer and the second retardation layer may also serve as protective layers. The thickness of each of the first polarizing plate and the second polarizing plate is in the range from 20 to 300 μm, for example. By setting the thickness in the above-described range, it is possible to obtain a polarizing plate having a still higher mechanical strength.

[D. Polarizer]

In the present invention, the "polarizer" refers to an element that can convert natural light or polarized light into any polarized light. The polarizer to be used in the present invention is not particularly limited, but preferably is the one that converts natural light or polarized light into linearly polarized light. Such a polarizer has a function of, when incident light is divided into two polarization components orthogonal to each other, allowing one of the polarization components to pass therethrough while preventing the other polarization component from passing therethrough by absorption, reflection, diffusion, or the like.

As described above, the transmittance ($T_1$) of the first polarizer preferably is in the range from 38.3% to 43.3%. By setting $T_1$ in the above-described range, it is possible to obtain a liquid crystal panel having a still higher contrast ratio in the front direction. It is more preferable that $T_1$ is in the range from 38.6% to 43.2%, still more preferably from 39.9% to 43.1%, and particularly preferably from 39.2% to 43.0%.

As described above, the transmittance ($T_2$) of the second polarizer preferably is in the range from 41.1% to 44.3%. By setting $T_2$ in the above-described range, it is possible to obtain a liquid crystal panel having a still higher contrast ratio in the front direction. It is more preferable that $T_2$ is in the range from 41.5% to 44.3%, still more preferably from 41.9% to 44.2%, and particularly preferably from 42.3% to 44.2%.

Examples of a method of increasing or decreasing the transmittance of the first polarizer and the second polarizer include, when a polarizer that contains a polyvinyl alcohol resin containing iodine is used as each of the first polarizer and the second polarizer includes, adjusting the iodine content in the first polarizer and the second polarizer. Specifically, by decreasing the iodine content in the first polarizer and the second polarizer, it is possible to increase the transmittance of each of the first polarizer and the second polarizer. This method is applicable to the production of a polarizer in a roll form and also to the production of each sheet of polarizer.

As described above, the polarization ratio of at least one of the first polarizer and the second polarizer preferably is at least 99%. By setting the polarization ratio to at least 99%, it is possible to obtain a liquid crystal panel having a still higher contrast ratio in the front direction. It is more preferable that the polarization ratio is at least 99.5%, still more preferably 99.8%. The polarization ratio can be measured by, for example, using a spectrophotometer (Murakami Color Research Laboratory, trade name "DOT-3"). The specific measurement method of the polarization ratio is as follows. The parallel transmittance ($H_0$) and the crossed transmittance ($H_{90}$) of each of the first polarizer and the second polarizer are measured, and the polarization ratio can be determined based on an equation: polarization ratio (%)=$\{(H_0-H_{90})/(H_0+H_{90})\}^{1/2} \times 100$. The parallel transmittance ($H_0$) is a transmittance of a parallel-type laminated polarizer produced by laminating two identical polarizers such that their absorption axes are parallel to each other. The crossed transmittance ($H_{90}$) is a transmittance of an orthogonal-type laminated polarizer produced by laminating two identical polarizers such that their absorption axes are orthogonal to each other. Note here that these transmittances are Y values whose luminous factors have been corrected in view of a two-degree visual field (C light source) according to JIS Z 8701(1982 version).

The first polarizer and the second polarizer used in the present invention preferably contain a polyvinyl alcohol resin containing iodine. Each of the first polarizer and the second polarizer can be obtained by stretching a polymer film that contains a polyvinyl alcohol resin containing iodine, for example. Such a polarizer has excellent optical characteristics.

The iodine content ($I_1$) in the first polarizer and the iodine content ($I_2$) in the second polarizer preferably has the relationship of $I_1 > I_2$. The difference ($\Delta I = I_1 - I_2$) between the iodine content ($I_1$) in the first polarizer and the iodine content ($I_2$) in the second polarizer preferably is in the range from 0.1 to 2.6 wt %. By setting the relationship of the iodine contents of the respective polarizers in the above-described range, it is possible to obtain a polarizing plate in which the relationship between the transmittances is in a more preferable range. As a result, it is possible to obtain a liquid crystal panel having a still higher contrast ratio in the front direction. It is more preferable that the difference ($\Delta I = I_1 - I_2$) is in the range from 0.1 to 2.0 wt %, still more preferably from 0.1 to 1.4 wt %, and particularly preferably, from 0.15 to 1.2 wt %.

Preferably, the iodine content in each of the first polarizer and the second polarizer is in the range from 1.8 to 5.0 wt %. By setting the iodine content of each of the polarizer in the above-described range, it is possible to obtain a polarizing plate whose transmittance is in a more preferable range. As a result, it is possible to obtain a liquid crystal panel having a still higher contrast ratio in the front direction. More preferably, the iodine content in each of the first polarizer and the second polarizer is in the range from 2.0 to 4.0 wt %. The iodine content in the first polarizer preferably is in the range from 2.3 to 5.0 wt %, more preferably from 2.5 to 4.5 wt %, and still more preferably from 2.5 to 4.0 wt %. The iodine content in the second polarizer preferably is in the range from 1.8 to 3.5 wt %, more preferably from 1.9 to 3.2 wt %.

It is preferable that the first polarizer and the second polarizer further contain potassium. The potassium content preferably is in the range from 0.2 to 1.0 wt %. By setting the potassium content in the above-described range, it is possible to obtain the polarizer having a transmittance in a more preferable range and a still higher polarization ratio. More preferably, the potassium content is in the range from 0.3 to 0.9 wt %, still more preferably in the range from 0.4 to 0.8 wt %.

It is preferable that the first polarizer and the second polarizer further contain boron. The boron content preferably is in the range from 0.5 to 3.0 wt %. By setting the boron content in the above-described range, it is possible to obtain the polarizer having a transmittance in a more preferable range and a still higher polarization ratio. More preferably, the boron content is in the range from 1.0 to 2.8 wt %, still more preferably in the range from 1.5 to 2.6 wt %.

The polyvinyl alcohol resin can be obtained by, for example, saponifying a vinyl ester polymer that is obtained by polymerizing a vinyl ester monomer. The saponification degree of the polyvinyl alcohol resin preferably is in the range from 95.0 to 99.9 mol %. By using the polyvinyl alcohol resin with the saponification degree in the above-described range, it is possible to obtain a polarizer with a higher durability.

With regard to the average polymerization degree of the polyvinyl alcohol resin, any suitable value can be selected as appropriate in accordance with the purpose of using the polyvinyl alcohol resin. The average polymerization degree preferably is in the range from 1200 to 3600. The average polymerization degree can be determined according to JIS K 6726 (1994 version), for example.

As a method of obtaining a polymer film containing the polyvinyl alcohol resin, any suitable processing method can be employed. Example of the processing method include the one that described in [Example 1] of JP 2000-315144 A.

The polymer film containing the polyvinyl alcohol resin preferably contains at least one of a plasticizer and a surfactant. Examples of the plasticizer include polyhydric alcohols such as ethylene glycol and glycerin. Examples of the surfactant include nonionic surfactants. The content of the plasticizer and the surfactant preferably is in the range from 1 to 10 parts by weight with respect to 100 parts by weight of the polyvinyl alcohol resin. The plasticizer and the surfactant further enhance the dye-affinity and the stretchability of the polarizer, for example.

As the polymer film containing the polyvinyl alcohol resin, it is possible to use a commercially available film as it is, for example. Examples of the commercially available polymer film containing the polyvinyl alcohol resin include "KURARAY VINYLON FILM (trade name)" manufactured by Kuraray Co., Ltd., "TOHCELLO VINYLON FILM (trade name)" manufactured by Tohcello Co., Ltd., and "NICHIGO VINYLON FILM (trade name)" manufactured by Nippon Synthetic Chemical Industry Co., Ltd.

Figure 2:
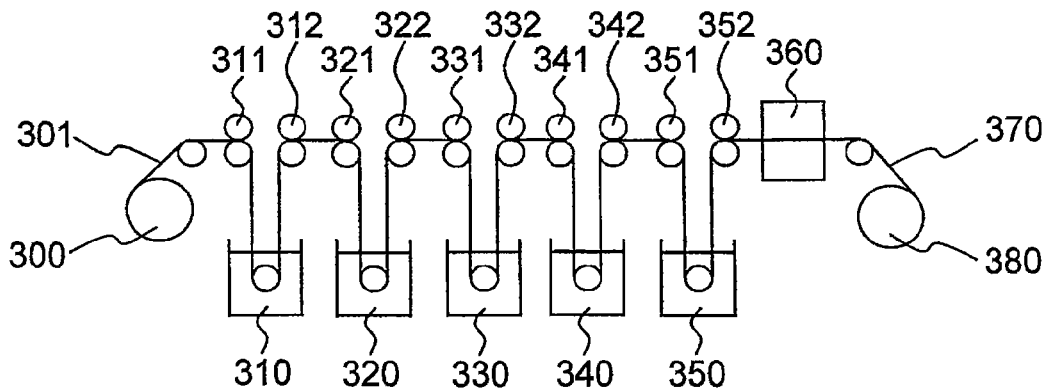
FIG. 2 is a schematic view showing the concept of an example of a manufacturing process of a polarizer to be used in the liquid crystal panel of the present invention.

One example of a method for manufacturing the polarizer will be described with reference to FIG. 2. FIG. 2 is a schematic view showing the concept of a typical manufacturing process of the polarizer used in the present invention. As shown in FIG. 2, a polymer film 301 containing a polyvinyl alcohol resin is fed from a feed portion 300, and is immersed in a swelling bath 310 containing pure water and a dye bath 320 containing an aqueous solution of iodine and potassium iodide, and is subjected to a swelling treatment and a dyeing treatment with a tensile force being applied to the film in the longitudinal direction by rolls 311, 312, 321, and 322 with different speed ratios. Subsequently, the film that has been subjected to the swelling treatment and the dyeing treatment is immersed in a first crosslinking bath 330 and a second crosslinking bath 340 that contain an aqueous solution of potassium iodide and boric acid and is subjected a crosslinking treatment and a final stretching treatment with a tensile force being applied to the film in the longitudinal direction by rolls 331, 332, 341, and 342 with different speed ratios. The film that has been subjected to the crosslinking treatment is immersed in a washing bath 350 containing pure water by rolls 351 and 352, thus being subjected to a washing treatment. The film that has been subjected to the washing treatment is dried by drying means 360, whereby the water content thereof is adjusted to be in the range from, e.g., 10% to 30%. The film then is wound up by a wind-up portion 380. A polarizer 370 can be obtained by stretching the polymer film (the raw film) to 5 to 7 times its original length, for example.

The amount of iodine added to the dye bath preferably is in the range from 0.01 to 0.15 parts by weight, more preferably from 0.01 to 0.05 parts by weight, with respect to 100 parts by weight of water. When the amount of iodine added to the dye bath is increased, then, a polarizer with a low transmittance can be obtained. When the amount of iodine added to the dye bath is decreased, then, a polarizer with a high transmittance can be obtained.

The amount of potassium iodide added to the dye bath preferably in the range from 0.05 to 0.5 parts by weight with respect to 100 parts by weight of water. By setting the amount of potassium iodide added to the dye bath in the above-described range, it is possible to obtain a polarizer having a transmittance in a more preferable range and a still higher polarization ratio. More preferably, the amount of potassium iodide added to the dye bath is in the range from 0.1 to 0.3 parts by weight.

The amount of potassium iodide added to the first crosslinking bath and the second crosslinking bath preferably is in the range from 0.5 to 10 parts by weight with respect to 100 parts by weight of water. The amount of boric acid added to the first crosslinking bath and the second crosslinking bath preferably is in the range from 0.5 to 10 parts by weight with respect to 100 parts by weight of water. By setting the amounts of potassium iodide and boric acid added to the first crosslinking bath and the second crosslinking bath in the above-described ranges, it is possible to obtain a polarizer having a transmittance in a more preferable range and a still higher polarization ratio. It is more preferable that the amount of potassium iodide added to the first crosslinking bath and the second crosslinking bath is in the range from 1 to 7 parts by weight. It is more preferable that the amount of boric acid added to the first crosslinking bath and the second crosslinking bath is in the range from 1 to 7 parts by weight.

[E. First Retardation Layer]

The refractive index ellipsoid of the first retardation layer has the relationship of nx=ny>nz (negative uniaxiality). The first retardation layer may be a single layer or may be a laminate of a plurality of layers. The thickness of the first retardation layer preferably is in the range from 0.5 to 200 μm. The transmittance (T[590]) of the first retardation layer at a wavelength of 590 nm preferably is at least 90%.

$Re_1[590]$ of the first retardation layer is less than 10 nm, for example. By setting $Re_1[590]$ in the above-described range, it is possible to obtain a liquid crystal panel having a still higher contrast ratio in the front direction. $Re_1[590]$ preferably is 5 nm or less, more preferably 3 nm or less.

$Rth_1[590]$ of the first retardation layer can be set as appropriate depending on the retardation value in the thickness direction of the liquid crystal cell, etc., for example. $Rth_1[590]$ preferably is in the range from 100 to 400 nm. By setting $Rth_1[590]$ in the above-described range, it is possible to obtain a liquid crystal panel with a still higher front contrast ratio. More preferably, $Rth_1[590]$ is in the range from 120 to 350 nm, still more preferably from 150 to 300 nm.

As the material of the first retardation layer, any suitable material can be employed as long as the refractive index ellipsoid has the relationship of nx=ny>nz (negative uniaxiality). As the material, it is possible to employ:

poly(4,4'-hexafluoroisopropylidene-bisphenol)terephthalate-co-isophthalate;

poly(4,4'-hexahydro-4,7-methanoindan-5-ylidene-bisphenol)terephthalate;

poly(4,4'-isopropylidene-2,2',6,6'-tetrachlorobisphenol) terephthalate-co-isophthalate;

poly(4,4'-hexafluoroisopropylidene)-bisphenol-co-(2-norbornylidene)-bisphenol terephthalate;

poly(4,4'-hexahydro-4,7-methanoindene-5-ylidene)-bisphenol-co-(4,4'-isopropylidene-2,2',6,6'-tetrabromo)-bisphenol terephthalate;

poly(4,4'-isopropylidene-bisphenol-co-4,4'-(2-norbornylidene)bisphenol) terephthalate-co-isophthalate; and copolymers thereof. They may be used alone or in combination of at least two kinds thereof.

As the first retardation layer, it is possible to use, for example, a retardation film containing a thermoplastic resin such as a polyimide resin, a cellulose resin, a norbornene resin, a polycarbonate resin, or a polyamide resin. Such a retardation film preferably contains 60 to 100 parts by weight of the thermoplastic resin with respect to 100 parts by weight of the total solid.

Preferably, the first retardation layer is any one of a retardation film (B1) containing a polyimide resin, a retardation film (B2) containing a cellulose resin, and a laminate (C) of the retardation film (B1) and the retardation film (B2). It is preferable that the laminate (C) is obtained by joining the retardation film (B1) to the retardation film (B2) via an adhesive layer or by forming the retardation film (B1) directly on the surface of the retardation film (B2) by welding or the like.

[Polyimide Resin]

When the polyimide resin is formed into a sheet-like shape by a solvent casting method, molecules are apt to align spontaneously during the evaporating process of the solvent, so that the retardation film with a refractive index ellipsoid having the relationship of nx=ny>nz (negative uniaxiality) can be made very thin. The thickness of the retardation film (B1) containing the polyimide resin preferably is in the range from 0.5 to 10 μm, more preferably from 1 to 5 μm. The birefringence ($\Delta n_{xz}[590]$) of the retardation film (B1) in the thickness direction preferably is in the range from 0.01 to 0.12, more preferably from 0.02 to 0.08. Such a polyimide resin can be obtained by the method described in U.S. Pat. No. 5,344,916, for example.

Preferably, the polyimide resin has at least one of a hexafluoroisopropylidene group and a trifluoromethyl group. More preferably, the polyimide resin has at least a repeating unit represented by the following general formula (I) or a repeating unit represented by the following general formula (II). The polyimide resin containing any of these repeating units exhibits excellent solubility in a general-purpose solvent, and thus can be formed into a film by a solvent casting method. Furthermore, it is possible to form a thin layer of the polyimide resin even on a base with poor solvent resistance, such as triacetyl cellulose film, without corroding the surface of the base too much.

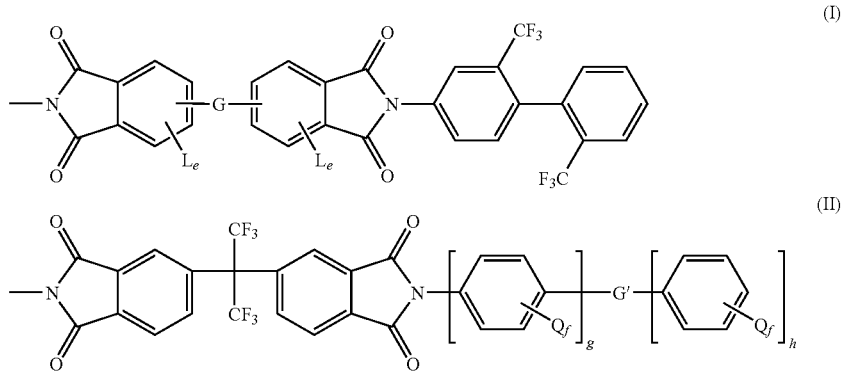

In the above general formulae (I) and (II), G and G' each are a group selected independently from the group consisting of a covalent bond, a $CH_2$ group, a $C(CH_3)_2$ group, a $C(CF_3)_2$ group, a $C(CX_3)_2$ group (where λ is halogen), a CO group, an O atom, an S atom, an $SO_2$ group, an $Si(CH_2CH_3)_2$ group, and an $N(CH_3)$ group, and G and G' may be the same or different.

In the above general formula (I), L is a substituent, and e indicates the number of substitutions therein. L is, for example, halogen, an alkyl group with a carbon number of 1 to 3, a halogenated alkyl group with a carbon number of 1 to 3, a phenyl group, or a substituted phenyl group, and when there are plural Ls, they may be the same or different. Furthermore, e is an integer from 0 to 3.

In the above general formula (II), Q is a substituent, and f indicates the number of substitutions therein. Q may be, for example, an atom or a group selected from the group consisting of hydrogen, halogen, an alkyl group, a substituted alkyl group, a nitro group, a cyano group, a thioalkyl group, an alkoxy group, an aryl group, a substituted aryl group, an alkyl ester group, and a substituted alkyl ester group and, when there are plural Qs, they may be the same or different. Furthermore, f is an integer from 0 to 4, and g and h each are an integer from 1 to 3.

Specific examples of the polyimide represented by the general formula (II) include the one represented by the following chemical formula (III), for example.

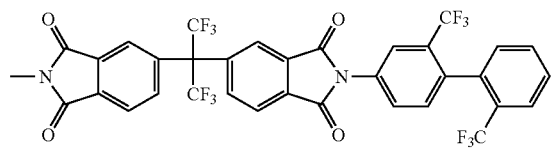

(III)

The polyimide resin can be obtained through a reaction between tetracarboxylic dianhydride and diamine, for example. The repeating unit of the general formula (I) can be obtained by, for example, using 2,2'-bis(trifluoromethyl)-4,4'-diaminobiphenyl as diamine and reacting this diamine with tetracarboxylic dianhydride having at least two aromatic rings. The repeating unit of the formula (II) can be obtained by, for example, using 2,2-bis(3,4-dicarboxyphenyl)hexafluoropropane dianhydride as tetracarboxylic dianhydride and reacting this tetracarboxylic dianhydride with diamine having at least two aromatic rings. The reaction may be chemical imidization that proceeds in two stages or may be thermal imidization that proceeds in a single stage, for example.

As the tetracarboxylic dianhydride, any suitable tetracarboxylic dianhydride can be selected. Examples of the tetracarboxylic dianhydride include:
2,2'-bis(3,4-dicarboxyphenyl)hexafluoropropane dianhydride;
3,3',4,4'-benzophenone tetracarboxylic dianhydride;
2,3,3',4-benzophenone tetracarboxylic dianhydride;
2,2',3,3'-benzophenone tetracarboxylic dianhydride;
2,2'-dibromo-4,4',5,5'-biphenyl tetracarboxylic dianhydride;
2,2'-bis(trifluoromethyl)-4,4',5,5'-biphenyl tetracarboxylic dianhydride;
3,3',4,4'-biphenyl tetracarboxylic dianhydride;
4,4'-bis(3,4-dicarboxyphenyl)ether dianhydride;
4,4'-oxydiphthalic dianhydride;
4,4'-bis(3,4-dicarboxyphenyl)sulfonic dianhydride; bis(2,3-dicarboxyphenyl)methanoic dianhydride; and
bis(3,4-dicarboxyphenyl)diethylsilane dianhydride.

As the diamine, any suitable diamine can be selected. Examples of the diamine include:
2,2'-bis(trifluoromethyl)-4,4'-diaminobiphenyl;
4,4'-diaminobiphenyl;
4,4'-diaminophenylmethane;
4,4'-(9-fluorenylidene)-dianiline;
3,3'-dichloro-4,4'-diaminophenylmethane;
2,2'-dichloro-4,4'-diaminobiphenyl;
4,4'-diaminophenylether;
3,4'-diaminodiphenylether;
4,4'-diaminodiphenylsulfone; and
4,4'-diaminodiphenylthioether.

The weight-average molecular weight (Mw) of the polyimide resin, which is determined based on a polyethylene oxide standard using as a developing solvent a dimethylformamide solution (10 mM lithium bromide and 10 mM phosphoric acid was added up to the standard mark on a measuring flask to prepare 1 l of dimethylformamide solution) preferably is in the range from 20000 to 180000. Preferably, the polyimide resin has an imidization ratio of at least 95%. The imidization ratio of the polyimide resin can be determined based on the integral intensity ratio between a proton peak derived from polyamic acid as a precursor of polyimide and a proton peak derived from polyimide, for example.

The retardation film (B1) containing the polyimide resin can be obtained by any suitable processing method. Preferably, the retardation film (B1) is produced by being formed into a sheet-like shape by a solvent casting method.

[Cellulose Resin]

As the cellulose resin, any suitable cellulose resin can be employed. Preferably, the cellulose resin is cellulose organic acid ester or cellulose-mixed organic acid ester in which at least one or all of the hydroxyl groups contained in cellulose are substituted by at least one group selected from an acetyl group, a propionyl group, and a butyl group. Examples of the cellulose organic acid ester include cellulose acetate, cellulose propionate, and cellulose butyrate. Examples of the cellulose-mixed organic acid ester include cellulose acetate propionate and cellulose acetate butyrate. The cellulose resin can be obtained by the method described in the paragraphs [0040] and [0041] of JP 2001-188128 A, for example.

The weight-average molecular weight (Mw) of the cellulose resin, which is measured by gel permeation chromatography (with a polystyrene standard) using a tetrahydrofuran solvent, preferably is in the range from 20000 to 1000000. The glass transition temperature (Tg) of the cellulose resin preferably is in the range from 110° C. to 185° C. The glass transition temperature (Tg) can be determined by a DSC method according to JIS K 7121. With the use of the above-described resin, it is possible to obtain a retardation film having a still higher thermal stability and a still higher mechanical strength.

The retardation film (B2) containing the cellulose resin can be obtained by any suitable processing method. Preferably, the retardation film (B2) is produced by being formed into a sheet-like shape by a solvent casting method. As the retardation film (B2), it is possible to use a commercially available polymer film containing a cellulose resin as it is, for example. Alternatively, it is possible to use the commercially available film that has been subjected to secondary processing, e.g., at least one of a stretching treatment and a shrinking treatment. Examples of the commercially available film include "FUJI-TAC series (trade name)" (ZRF80S, TD80UF, TDY-80UL) manufactured by Fuji Photo Film Co., Ltd. and "KC8UX2M (trade name)" manufactured by Konica Minolta Opto, Inc.

The retardation film used as the first retardation layer may further contain any suitable additive. Examples of the additive include plasticizers, thermostabilizers, light stabilizers, lubricants, antioxidants, UV absorbers, flame retardants, colorants, antistatic agents, compatibilizers, crosslinking agents, and thickeners. The content of the additive preferably is more than 0 and not more than 10 parts by weight with respect to 100 parts by weight of the resin as a main component.

In the first retardation layer, a liquid crystalline composition may be used. When the liquid crystalline composition is used, the first retardation layer includes a solidified layer or a cured layer of a liquid crystalline composition containing a rod-shaped liquid crystal compound that is in a planar alignment, or a solidified layer or a cured layer of a liquid crystalline composition containing a discotic liquid crystal compound that is in a columnar alignment. When the liquid crystal compound is used, the birefringence in the thickness direction is great, so that a thin retardation film can be obtained.

The retardation film including a solidified layer or a cured layer of a liquid crystalline composition containing a rod-shaped liquid crystal compound that is in a planar alignment can be obtained by a method described in JP 2003-287623 A, for example. Furthermore, the retardation film including a solidified layer or a cured layer of a liquid crystalline composition containing a discotic liquid crystal compound that is in a columnar alignment can be obtained by the method described in JP 9 (1997)-117983 A, for example.

[F. Second Retardation Layer]

The refractive index ellipsoid of the second retardation layer has the relationship of nx>ny≧nz. In the present invention, "having the relationship of nx>ny≧nz" means having the relationship of nx>ny=nz (positive uniaxiality) or having the relationship of nx>ny≧nz (negative biaxiality). The second retardation layer may be a single layer having retardation or may be a laminate of a plurality of layers. The thickness of the second retardation layer preferably is in the range from 0.5 to 200 μm. The transmittance (T[590]) of the second retardation layer at a wavelength of 590 nm preferably is at least 90%.

It is preferable that the retardation value of the second retardation layer at a wavelength of 590 nm in at least one of the in-plane direction and the thickness direction is at least 100 nm.

$Re_2[590]$ of the second retardation layer is, for example, at least 10 nm, preferably is in the range from 50 to 200 nm. When the refractive index ellipsoid of the second retardation layer has the relationship of nx>ny=nz (positive uniaxiality), it is preferable that $Re_2[590]$ is in the range from 90 to 190 nm. When the refractive index ellipsoid of the second retardation layer has the relationship of nx>ny≧nz (negative biaxiality), it is preferable that $Re_2[590]$ is in the range from 70 to 170 nm. By setting $Re_2[590]$ in the above-described range, it is possible to obtain a liquid crystal panel having a still higher contrast ratio in the front direction. When the refractive index ellipsoid of the second retardation layer has the relationship of nx>ny=nz (positive uniaxiality), it is more preferable that $Re_2[590]$ is in the range from 110 to 170 nm. When the refractive index ellipsoid of the second retardation layer has the relationship of nx>ny≧nz (negative biaxiality), it is more preferable that $Re_2[590]$ is in the range from 90 to 150 nm.

When the refractive index ellipsoid of the second retardation layer has the relationship of nx>ny=nz (positive uniaxiality), $Re_2[590]$ and $Rth_2[590]$ are substantially the same. In this case, it is preferable that the second retardation layer satisfies the equation:

$$|Rth_2[590]-Re_2[590]|<10 \text{ nm}.$$

When the refractive index ellipsoid of the second retardation layer has the relationship of nx>ny≧nz (negative biaxiality), $Rth_2[590]$ is greater than $Re_2[590]$. In this case, the difference between $Rth_2[590]$ and $Re_2[590]$ ($Rth_2[590]-Re_2[590]$) is in the range from, for example, 10 to 100 nm, preferably 20 to 80 nm.

The Nz coefficient of the second retardation layer at a wavelength of 590 nm can be set as appropriate. When the refractive index ellipsoid of the second retardation layer has the relationship of nx>ny=nz (positive uniaxiality), the Nz coefficient is, for example, more than 0.9 and less than 1.1.

When the refractive index ellipsoid of the second retardation layer has the relationship of nx>ny≧nz (negative biaxiality), the Nz coefficient is in the range from, for example, 1.1 to 3.0, preferably 1.1 to 2.0, and more preferably 1.1 to 1.5.

As a material for forming the second retardation layer, it is possible to employ any suitable material as long as the refractive index ellipsoid has the relationship of nx>ny≧nz. As the second retardation layer, a retardation film containing a thermoplastic resin such as a norbornene resin, a polycarbonate resin, a cellulose resin, or a polyester resin is used, for example. The retardation film preferably contains 60 to 100 parts by weight of the thermoplastic resin with respect to 100 parts by weight of the total solid.

Preferably, the second retardation layer is a retardation film (A) containing the norbornene resin. The norbornene resin is characterized in that the absolute value of the photoelastic coefficient (C[λ], where λ can be set to 590 nm, for example) is small. In the present invention, the "norbornene resin" refers to a (co)polymer obtained by using a norbornene monomer having a norbornene ring as part or whole of the starting material (a monomer). The term "(co)polymer" means a homopolymer or a copolymer.

The absolute value (C[590]) of the photoelastic coefficient of the norbornene resin at a wavelength of 590 nm preferably is in the range from $1\times10^{-12}$ m²/N to $1\times10^{-11}$ m²/N. By using the retardation film in which the absolute value of the photoelastic coefficient is in the above-described range, it is possible to obtain a liquid crystal panel in which optical irregularities are still smaller.

As the starting material of the norbornene resin, a norbornene monomer having a norbornene ring (which is a norbornane ring having a double bond) is used. When the norbornene resin is in the form of (co)polymer, the norbornane ring may or may not be present in the constitutional unit. Examples of the norbornene resin having a norbornane ring in the constitutional unit when it is in the form of (co)polymer include tetracyclo[$4.4.1^{2,5}.1^{7,10}$.0]dec-3-en, 8-methyl tetracyclo[$4.4.1^{2,5}.1^{7,10}$.0]dec-3-en, and 8-methoxycarbonyl tetracyclo[$4.4.1^{2,5}.1^{7,10}$.0]dec-3-en. Examples of the norbornene resin not having a norbornane ring in the constitutional unit when it is in the form of (co)polymer include (co)polymers obtained by using a monomer that turns to a 5-membered ring upon cleavage. Examples of the monomer that turns to a 5-membered ring upon cleavage include norbornene, dicyclopentadiene, 5-phenyl norbornene, and derivatives thereof. When the norbornene resin is a copolymer, the alignment state of its molecules is not particularly limited, and the copolymer may be a random copolymer, a block copolymer, or a graft copolymer.

Examples of the norbornene resin include: (a) a resin obtained by hydrogenating a ring-opening (co)polymer of a norbornene monomer; and (b) a resin obtained through addition (co)polymerization of a norbornene monomer. The resin obtained by hydrogenating a ring-opening copolymer of a norbornene monomer includes a resin obtained by hydrogenating a ring-opening copolymer of at least one kind of norbornene monomer with at least one selected from α-olefins, cycloalkenes, and unconjugated dienes. The resin obtained through addition copolymerization of a norbornene monomer includes a resin obtained through addition copolymerization of at least one kind norbornene monomer with at least one selected from α-olefins, cycloalkenes, and unconjugated dienes.

The resin obtained by hydrogenating a ring-opening (co) polymer of a norbornene monomer can be obtained by, for example, obtaining a ring-opening (co)polymer by causing a metathesis reaction of the norbornene monomer or the like and then hydrogenating the ring-opening (co)polymer. Specifically, this can be achieved by a method described in paragraphs [0059] and [0060] of JP 11(1999)-116780 A, a method described in paragraphs [0035] to [0037] of JP 2001-350017 A, etc., for example. The resin obtained through addition (co)polymerization of a norbornene monomer can be obtained by a method described in Example 1 of JP 61 (1986)-292601 A, for example.

With regard to the weight-average molecular weight (Mw) of the norbornene resin, it is preferable that the measured value obtained by gel permeation chromatography (polystyrene standard) using a tetrahydrofuran solvent is in the range from 20000 to 500000. The glass transition temperature (Tg) of the norbornene resin preferably is in the range from 120° C. to 170° C. With the use of the above-described resin, it is possible to obtain a retardation film with a still higher thermal stability and still higher stretchability. The glass transition temperature (Tg) is a value calculated by a DSC method according to JIS K 7121, for example.

The retardation film (A) containing the norbornene resin can be obtained by any suitable processing method. Preferably, the retardation film (A) containing the norbornene resin is produced by stretching a polymer film, which has been formed into a sheet-like shape by a solvent casting method or a melt extrusion method, by a longitudinal uniaxial stretching method, a transverse uniaxial stretching method, a longitudinal-transverse simultaneous biaxial stretching method, or a longitudinal-transverse sequential biaxial stretching method. It is preferable that the stretching method is the transverse uniaxial stretching method. This is because, according to the transverse uniaxial stretching method, it becomes possible to produce a polarizing plate in which the slow axis of the retardation film (A) is orthogonal to the absorption axis of the polarizer successively by roll-to-roll processing, so that the productivity of such a polarizing plate can be improved significantly. That is, the polarizer generally is produced by stretching a material for forming the polarizer in the longitudinal direction between a plurality of rolls. In this process, if the retardation film (A) is produced by the transverse uniaxial stretching method, a polarizing plate in which the slow axis of the retardation film (A) is orthogonal to the absorption axis of the polarizer can be obtained by performing the lamination of the retardation film (A) and the polarizer successively in the same direction. As a result, the manufacturing efficiency of such a polarizing plate can be improved. The temperature at which the polymer film is stretched (the stretching temperature) preferably is in the range from 120° C. to 200° C. The ratio at which the polymer film is stretched (the stretch ratio) preferably is more than 1 and not more than 4 times. The stretching method may be a fixed-end stretching method or a free-end stretching method.

As the retardation film (A) containing the norbornene resin, it is possible to use a commercially available film as it is, for example. Alternatively, it is possible to use the commercially available film that has been subjected to secondary processing, e.g., at least one of a stretching treatment and a shrinking treatment. Examples of the commercially available retardation film (A) containing the norbornene resin include "ARTON series (trade name)" CARTON F, ARTON FX, ARTON D) manufactured by JSR Corporation and "ZEONOR series (trade name)" (ZEONOR ZF14, ZEONOR ZF15, ZEONOR ZF16) manufactured by OPTES INC.

The retardation film used as the second retardation layer may further contain any suitable additive. Examples of the additive include plasticizers, thermostabilizers, light stabilizers, lubricants, antioxidants, UV absorbers, flame retardants, colorants, antistatic agents, compatibilizers, crosslinking agents, and thickeners. The content of the additive preferably is more than 0 and not more than 10 parts by weight with respect to 100 parts by weight of the resin as a main component.

[G. Lamination of Second Polarizer and Second Retardation Layer]

In the liquid crystal panel of the present invention, it is preferable that the second polarizer and the second retardation layer are laminated via an adhesive layer. In the example shown in FIG. 1, the second polarizer 14b and the second retardation layer 12 are laminated via an adhesive layer.

The surface of the second retardation layer to be adhered to the second polarizer preferably is subjected to an adhesion-improving treatment. It is preferable that the adhesion-improving treatment is a treatment of coating a resin material onto the surface. As the resin material, silicon resins, urethane resins, and acrylic resins are preferable. By performing the adhesion-improving treatment, an adhesion-improving layer is formed on the adhesion surface. The thickness of the adhesion-improving layer preferably is in the range from 5 to 100 nm, more preferably from 10 to 80 nm.

The adhesive layer may be provided on either the second polarizer side or the second retardation layer side, or on both the second polarizer side and the second retardation layer side.

When the adhesive layer is a pressure-sensitive adhesive layer formed of a pressure-sensitive adhesive, it is possible to employ any suitable pressure-sensitive adhesive as the pressure-sensitive adhesive. Specifically, examples of the pressure-sensitive adhesive include solvent-type pressure-sensitive adhesives, nonaqueous emulsion-type pressure-sensitive adhesives, aqueous pressure-sensitive adhesives, and hot-melt pressure-sensitive adhesive. Among these, a solvent-type pressure-sensitive adhesive containing an acrylic polymer as a base polymer preferably is used. This is because the pressure-sensitive adhesive layer formed of such a solvent-type pressure-sensitive adhesives exhibits appropriate sticking characteristics (e.g., wettability, cohesiveness, and adhesiveness) with respect to the second polarizer and the second retardation layer and is excellent in optical transparency, weather resistance, and heat resistance.

The thickness of the pressure-sensitive adhesive layer can be set as appropriate depending on the purpose of using the layer, adhesion strength, etc. Specifically, the thickness of the pressure-sensitive adhesive layer preferably is in the range from 1 to 100 μm, more preferably from 3 to 50 μm, still more preferably from 5 to 30 μm, and particularly preferably 10 to 25 μm.

The adhesive layer may be formed by, for example, coating a coating solution containing an adhesive in a predetermined proportion onto a surface of at least one of the second retardation layer and the second polarizer and then drying it. As a method of preparing the coating solution, any suitable method can be employed. As the coating solution, for example, a commercially available solution or dispersion may be used, a mixture obtained by further adding a solvent to a commercially available solution or dispersion may be used, or a mixture obtained by dissolving or dispersing a solid in a solvent of various types may be used.

As the adhesive, an adhesive having any suitable property, form, and adhesion mechanism can be used depending on the purpose of using it. Specifically, examples of the adhesive include water-soluble adhesives, emulsion-type adhesives, latex-type adhesives, mastic adhesives, multilayer adhesives, paste-form adhesives, foaming-type adhesives, supported film adhesives, thermoplastic adhesives, thermofusible adhesives, heat solidified-type adhesives, hot-melt adhesives, heat activated-type adhesives, heat-sealing adhesives, thermosetting adhesives, contact-type adhesives, pressure-sensitive adhesives, polymerization-type adhesives, solvent-type adhesives, and solvent activated-type adhesives. Among these, water-soluble adhesives are preferable, because they are excellent in transparency, adhesiveness, and operability, and can impart excellent quality and cost efficiency to a product.

The water-soluble adhesive may contain at least one of a water-soluble naturally-occurring polymer and a water-soluble synthetic polymer, for example. Examples of the naturally-occurring polymer include proteins and starches. Examples of the synthetic polymer include resole resins, urea resins, melamine resins, polyethylene oxide, polyacrylamide, polyvinyl pyrrolidone, acrylic ester, methacrylic ester, and polyvinyl alcohol resins. Among these, a water-soluble adhesive that contains a polyvinyl alcohol resin is used preferably, and a water-soluble adhesive that contains a modified polyvinyl alcohol resin containing an acetoacetyl group (an acetoacetyl group-containing polyvinyl alcohol resin) is used more preferably. That is, in the liquid crystal panel of the present invention, it is preferable that the adhesive layer contains a water-soluble adhesive containing a polyvinyl alcohol resin. This is because such an adhesive achieves particularly excellent adhesiveness to the second polarizer and also achieves excellent adhesiveness to the second retardation layer. Examples of the acetoacetyl group-containing polyvinyl alcohol resin include "GOHSENOL Z series (trade name)" manufactured by Nippon Synthetic Chemical Industry Co., Ltd., "GOHSENOL NH series (trade name)" manufactured by the same, and "GOHSEFIMER Z series (trade name)" manufactured by the same.

Examples of the polyvinyl alcohol resin include a saponified product of polyvinyl acetate, derivatives of the saponified product, saponified products of copolymers of monomers that can copolymerize with vinyl acetate, and modified polyvinyl alcohols obtained through acetalization, urethanization, etherification, grafting, phosphorylation, etc. of polyvinyl alcohols. Examples of the monomer include unsaturated carboxylic acids such as maleic acid, maleic anhydride, fumaric acid, crotonic acid, itaconic acid, acrylic acid, and methacrylic acid, and esters thereof, α-olefins such as ethylene and propylene, allylsulfonate, methallylsulfonate, sodium allylsulfonate, sodium methallylsulfonate, sodium sulfonate, sodium sulfonate monoalkyl malate, sodium disulfonate alkyl malate, N-methylol acrylamide, acrylamide alkyl sulfonate alkali salt, N-vinyl pyrrolidone, and derivatives of N-vinyl pyrrolidone. These resins may be used alone or in combination of at least two kinds thereof.

The average polymerization degree of the polyvinyl alcohol resin preferably is in the range from 100 to 5000, more preferably from 1000 to 4000 from the viewpoint of adhesiveness. The average saponification degree of the polyvinyl alcohol resin preferably is in the range from 85 to 100 mol %, more preferably from 90 to 100 mol % from the viewpoint of adhesiveness.

The acetoacetyl group-containing polyvinyl alcohol resin can be obtained by reacting a polyvinyl alcohol resin with diketene by any method, for example. Specifically, this can be achieved by: adding diketene to a dispersion obtained by dispersing the polyvinyl alcohol resin in a solvent such as acetic acid; by adding diketene to a solution obtained by dissolving the polyvinyl alcohol resin in a solvent such as dimethylformamide or dioxane; or by bringing diketene gas or liquid diketene into contact with the polyvinyl alcohol resin directly, for example.

The modification degree of the acetoacetyl group-containing polyvinyl alcohol resin with an acetoacetyl group is at least 0.1 mol %, for instance. By setting the acetoacetyl group modification degree in above-described range, it is possible to obtain a liquid crystal panel with still higher water resistance. The acetoacetyl group modification degree preferably is in the range from 0.1 to 40 mol %, more preferably from 1 to 20 mol %, and still more preferably from 2 to 7 mol %. The acetoacetyl group modification degree is a value measured by nuclear magnetic resonance (NMR), for example.

The water-soluble adhesive containing the polyvinyl alcohol resin may further contain a crosslinking agent. This is because this can improve the water resistance still further. As the crosslinking agent, any suitable crosslinking agent can be employed. Preferably, the crosslinking agent is a compound having at least two functional groups reactive with the polyvinyl alcohol resin. Examples of the crosslinking agent include: alkylene diamines having an alkylene group and two amino groups, such as ethylene diamine, triethylene diamine, and hexamethylene diamine; isocyanates such as tolylene diisocyanate, hydrogenated tolylene diisocyanate, trimethylolpropane tolylene diisocyanate adducts, triphenylmethane triisocyanate, methylene bis(4-phenyl)methane triisocyanate, isophorone diisocyanate, and ketoxime-blocked products or phenol-blocked products thereof; epoxies such as ethylene glycol diglycidyl ether, polyethylene glycol diglycidyl ether, glycerin diglycidyl ether, glycerin tridiglycidyl ether, 1,6-hexane diol diglycidyl ether, trimethylolpropane tridiglycidyl ether, diglycidyl aniline, and diglycidylamine; monoaldehydes such as formaldehyde, acetaldehyde, propionaldehyde, and butylaldehyde; dialdehydes such as glyoxal, malondialdehyde, succindialdehyde, glutardialdehyde, maleindialdehyde, and phthaldialdehyde; amino-formaldehyde resins such as methylol urea, methylol melamine, alkylated methylol urea, alkylated methylolated melamine, acetoguanamine, and condensation products of benzoguanamine with formaldehyde; salts of divalent metals or trivalent metals such as sodium, potassium, magnesium, calcium, aluminum, iron, and nickel, and oxides thereof. Among these, amino-formaldehyde resins and dialdehydes are preferable. As the amino-formaldehyde resins, compounds having a methylol group are preferable. As the dialdehyde, glyoxal is preferable. Among the above-noted materials, compounds having a methylol group are preferable, and methylol melamine is particularly preferable. Examples of the aldehyde compound include "GLYOXAL (trade name)" available from Nippon Synthetic Chemical Industry Co., Ltd. and "SEQUAREZ 755 (trade name)" available from OMNOVA. Examples of the amine compound include "META-XYLENEDIAMINE (trade name)" available from Mitsubishi Gas Chemical Co., Inc. Examples of the methylol compound include "WATERSOL series (trade name)" available from Dainippon Ink and Chemicals, Inc.

The amount of the crosslinking agent to be blended is, for example, is in the range from 1 to 60 parts by weight with respect to 100 parts by weight of the polyvinyl alcohol resin (preferably, the acetoacetyl group-containing polyvinyl alcohol resin). By setting the blended amount in the above-described range, it is possible to form an adhesive layer that is excellent in transparency, adhesiveness, and water resistance. The upper limit of the blended amount preferably is 50 parts by weight, more preferably 30 parts by weight, still more preferably 15 parts by weight, particularly preferably 10 parts by weight, and most preferably 7 parts by weight. The lower limit of the blended amount preferably is 5 parts by weight, more preferably 10 parts by weight, and still more preferably 20 parts by weight. Note here that, by using a metal compound colloid that will be described later in combination, it is possible to further improve the stability in the case where the blended amount of the crosslinking agent is large.

It is preferable that the water-soluble adhesive containing the polyvinyl alcohol resin further contains a metal compound colloid. This is because this can prevent the generation of "knicks", which are defective local irregularities formed at the interface between the second polarizer and the second retardation layer. As described above, the second retardation layer may also serve as a protective layer. The presence or absence of the knicks can be checked by a method described later in the examples, for instance.

As described above, the liquid crystal panel of the present invention can be produced by, for example, laminating respective components with an adhesive. However, in a method for producing the liquid crystal panel of the present invention, it is preferable to use the water-soluble adhesive containing the above-described polyvinyl alcohol resin and metal compound colloid for the lamination of the second polarizer and the second retardation layer.

Furthermore, in this respect, in the liquid crystal panel of the present invention, it is preferable that the second polarizer and the second retardation layer are laminated using the water-soluble adhesive containing the polyvinyl alcohol resin and the metal compound colloid.

Still further, in the liquid crystal panel of the present invention, it is preferable that the second polarizer and the second retardation layer are laminated via an adhesive layer formed of the water-soluble adhesive containing the polyvinyl alcohol resin and the metal compound colloid and that the adhesive layer contains metal compound fine particles derived from the metal compound colloid.

The metal compound colloid may be made up of, for example, metal compound fine particles dispersed in a dispersion medium, and may be stabilized electrostatically owing to mutual repulsion of the same type of electric charge of the fine particles so that it remains stabile permanently. The average particle diameter of the metal compound fine particles is not particularly limited, and preferably is in the range from 1 to 100 nm, more preferably from 1 to 50 nm. This is because this allows the fine particles to be dispersed uniformly in the adhesive layer, whereby the formation of knicks can be prevented more favorably while maintaining the adhesiveness.

As the metal compound, any suitable compound can be employed. Examples of the metal compound include metal oxides such as alumina, silica, zirconia, and titania, metal salts such as aluminum silicate, calcium carbonate, magnesium silicate, zinc carbonate, barium carbonate, and calcium phosphate, and minerals such as cerite, talc, clay, and kaoline. Among these, alumina is preferable.

The metal compound colloid is present in the state of a colloid solution in which the metal compound is dispersed in a dispersion medium, for example. Examples of the dispersion medium include water and alcohols. The solid content in the colloid solution is in the range from 1 to 50 wt %, for example. The colloid solution may contain an acid such as nitric acid, hydrochloric acid, and acetic acid as a stabilizer.

The blended amount of the metal compound colloid (the solid) preferably not more than 200 parts by weight with respect to 100 parts by weight of the polyvinyl alcohol resin. By setting the blended amount in the above-described range, the formation of knicks can be prevented more favorably while maintaining the adhesiveness. It is more preferable that the blended amount is in the range from 10 to 200 parts by weight, still more preferably from 20 to 175 parts by weight, and particularly preferably from 30 to 150 parts by weight.

As a method of preparing the adhesive, any suitable method can be employed. For example, in the case of the adhesive containing the metal compound colloid, the method can be such that the polyvinyl alcohol resin and the crosslinking agent are mixed together beforehand, the concentration of the mixture is adjusted to a suitable value, and then the metal compound colloid is blended into the mixture, for example. Also, it is possible to mix the polyvinyl alcohol resin and the metal compound colloid and then add the crosslinking agent to the mixture considering the time when it is used, etc.

The resin concentration in the adhesive preferably is in the range from 0.1 to 15 wt %, more preferably from 0.5 to 10 wt %, from the viewpoint of the coatability, the stability when being left, etc.

The pH of the adhesive preferably is in the range from 2 to 6, more preferably from 2.5 to 5, still more preferably from 3 to 5, and particularly preferably from 3.5 to 4.5. Generally, the surface charge of the metal compound colloid can be controlled by adjusting the pH of the adhesive. The surface charge preferably is positive charge. When the surface charge is positive charge, it is possible to prevent the formation of knicks more favorably, for example.

The total solid content in the adhesive varies depending on the solubility, coating viscosity, and wettability of the adhesive, the desired thickness of the adhesive layer, etc. The total solid content preferably is in the range from 2 to 100 parts by weight with respect to 100 parts by weight of the solvent. By setting the total solid concentration in the above-described range, it is possible to obtain an adhesive layer with still higher surface uniformity. It is more preferable that the solid content is in the range from 10 to 50 parts by weight, still more preferably from 20 to 40 parts by weight.

The viscosity of the adhesive is not particularly limited, but preferably is in the range from 1 to 50 mPa·s when measured at a shear rate of 1000(1/s) at 23° C. By setting the viscosity of the adhesive in the above-described range, it is possible to obtain an adhesive layer with still higher surface uniformity. It is more preferable that the viscosity of the adhesive is in the range from 2 to 30 mPa·s, still more preferably from 4 to 20 mPa·s.

The glass transition temperature (Tg) of the adhesive is not particularly limited, and preferably is in the range from 20° C. to 120° C., more preferably from 40° C. to 100° C., and still more preferably from 50° C. to 90° C. The glass transition temperature can be measured by a differential scanning calorimetry (DSC) measurement according to JIS K 7127 (1987 version), for example.

The adhesive may further contain a coupling agent such as a silane coupling agent or a titanium coupling agent, a tackifier of various types, an UV absorber, an antioxidant, a stabilizer such as a stabilizer for imparting heat resistance or a stabilizer for imparting hydrolysis resistance.

As a method of coating the adhesive, any suitable method can be employed. Examples of the coating method include spin coating, roller coating, flow coating, clip coating, and bar coating.

The thickness of the adhesive layer is not particularly limited, and preferably is in the range from 0.01 to 0.15 μm. By setting the thickness of the adhesive layer in the above-described range, it is possible to obtain a polarizing plate with excellent durability, in which peeling or lifting of the polarizer does not occur even when subjected to a high temperature and high humidity environment. It is more preferable that the thickness of the adhesive layer is in the range from 0.02 to 0.12 μm, still more preferably from 0.03 to 0.09 μm.

[H. Protective Layer]

The protective layer used in the present invention is provided for the purpose of preventing shrinkage or expansion of the polarizers or deterioration of the polarizers caused by ultraviolet rays, for example. The thickness of the protective layer preferably is in the range from 20 to 100 μm. The transmittance (T[590]) of the protective layer at a wavelength of 590 nm preferably is at least 90%.

As a material of the protective layer, it is possible to select any suitable material. Preferably, the protective layer is a polymer film containing a cellulose resin, a norbornene resin, or an acrylic resin. The polymer film containing the cellulose resin can be obtained by the method described in Example 1 of JP 7 (1995)-112446 A, for example. The polymer film containing the norbornene resin can be obtained by the method described in JP 2001-350017 A, for example. The polymer film containing an acrylic resin can be obtained by the method described in Example 1 of JP 2004-198952 A, for example.

The protective layer may have a surface treatment layer on the side opposite to the polarizer side. As the surface treatment, a suitable treatment can be employed as appropriate depending on the purpose of performing it. Examples of the surface treatment layer include treatment layers for performing a hard-coat treatment, an antistatic treatment, a treatment for preventing reflection (also referred to as an antireflection treatment), and a diffusion treatment (also referred to as an anti-glare treatment). These surface treatments are used for the purpose of preventing the screen from being contaminated or damaged and also preventing the display screen image from being unable to be seen clearly by reflected glare of a fluorescent lamp in a room or sunlight in the screen. As the surface treatment layer, a layer obtained by fixing a treatment agent for forming the treatment layer on a surface of a base film generally is used. The base film may also serve as the protective layer. Moreover, the surface treatment layer may have a multilayer structure in which a hard-coat treatment layer is laminated on an antistatic treatment layer, for example.

As the protective layer, a surface-treated commercially available polymer film can be used as it is, for example. Alternatively, it is possible to use the commercially available polymer film after subjecting it to any surface treatment. Examples of a commercially available film that has been subjected to the diffusion treatment (the anti-glare treatment) include "AG150, AGS1, and AGS2 (trade name)" manufactured by Nitto Denko Corporation. Examples of a commercially available film that has been subjected to the treatment for preventing reflection (the antireflection treatment) include "ARS, ARC (trade name)" manufactured by Nitto Denko Corporation. Examples of a commercially available film that has been subjected to the hard-coat treatment and the antistatic treatment include "KC8UX-HA (trade name)" manufactured by Konica Minolta Opto, Inc. Examples of a commercially available film that has been subjected to the antireflection treatment include "REOLOOK series (trade name)" manufactured by NOF CORPORATION.

As described above, other optical elements such as the first retardation layer and the second retardation layer may be used as protective layers.

[I. Liquid Crystal Display]

Figure 3:
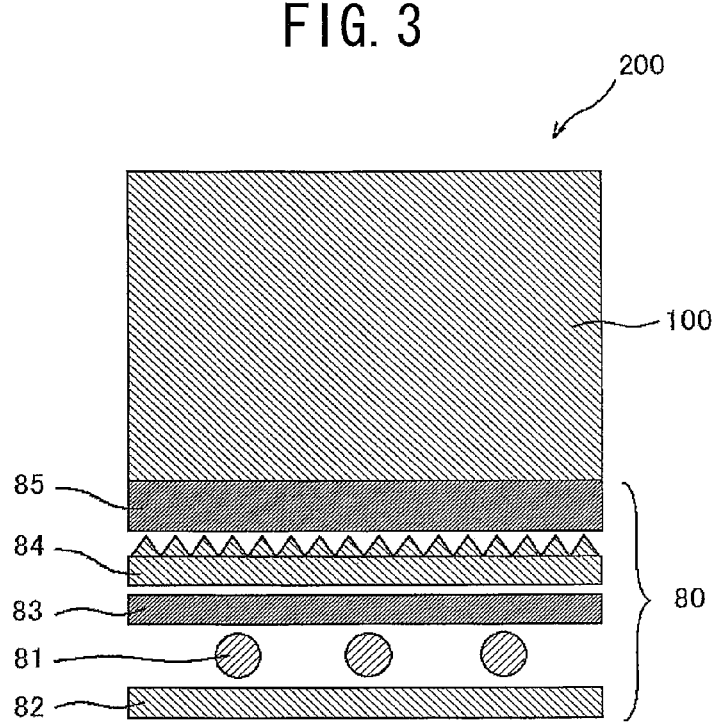
FIG. 3 is a schematic sectional view showing an example of the configuration of a liquid crystal display of the present invention.
Figure 4:
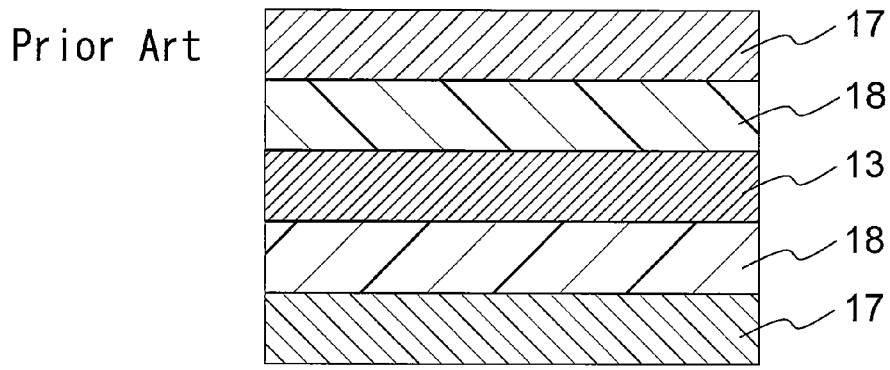
FIG. 4 is a schematic sectional view showing the configuration of a conventional liquid crystal panel.

A liquid crystal display of the present invention is characterized in that it includes the liquid crystal panel according to the present invention. FIG. 3 is a schematic sectional view showing the configuration of an example of the liquid crystal display of the present invention. In FIG. 3, the sizes, proportions, etc. of the respective components are different from the actual sizes, proportions, etc, for the sake of simplicity in illustration. As shown in FIG. 3, this liquid crystal display 200 includes at least a liquid crystal panel 100 and a direct-type backlight unit 80 arranged on one side of the liquid crystal panel 100. The direct-type backlight unit 80 includes at least light sources 81, a reflection film 82, a diffusion plate 83, a prism sheet 84, and a brightness enhancement film 85. Although the liquid crystal display 200 according to the present example employs the direct-type backlight unit, the present invention is not limited thereto, and a sidelight-type backlight unit can be used, for example. The sidelight-type backlight unit includes at least a light guide plate and a light reflector, in addition to the configuration of the direct-type backlight unit. Note here that the components shown in FIG. 3 for illustrative purposes can be omitted partially or substituted by another optical element depending on the lighting system of the liquid crystal display, the driving mode of the liquid crystal cell, the intended use, etc. as long as the effect of the present invention can be obtained.

The liquid crystal display of the present invention may be a transmission type liquid crystal display in which the screen is seen by being irradiated with light from the back surface side of the liquid crystal panel, may be a reflection type liquid crystal display in which the screen is seen by being irradiated with light from the display surface side of the liquid crystal panel, or may be a semi-transmission type liquid crystal display having the properties of both the transmission type and the reflection type liquid crystal displays.

[J. Use of Liquid Crystal Display]

The liquid crystal display of the present invention is applicable to any suitable use. Examples of the use thereof include: office automation equipment such as computer monitors, notebook computers, and copy machines; portable devices such as mobile phones, watches, digital cameras, personal digital assistants (PDAs), and portable game devices; household electric appliances such as video cameras, televisions, and microwave ovens; vehicle-mounted devices such as back monitors, car navigation system monitors, and car audios; exhibition devices such as information monitors for commercial stores; security devices such as surveillance monitors; and nursing care and medical devices such as nursing-care monitors and medical monitors.

Preferably, the liquid crystal display of the present invention is used in a television. The screen size of the television preferably is a wide-screen 17-inch type (373 mm×224 mm) or larger, more preferably a wide-screen 23-inch type (499 mm×300 mm) or larger, and still more preferably a wide-screen 32-inch type (687 mm×412 mm) or larger.

EXAMPLES

Hereinafter, examples of the present invention will be described together with comparative examples. It is to be noted, however, the present invention is by no means limited to the following examples and comparative examples. Various physical properties and characteristics described in the respective examples and comparative examples were evaluated or measured by the following methods.

(1) Transmittance of Polarizer

The transmittance (T) of a polarizer was determined by measuring a Y value whose luminous factor had been corrected in view of a two-degree visual field (C light source) according to JIS Z 8701 (1982 version) using a spectrophotometer [Murakami Color Research Laboratory, product name "DOT-3"].

(2) Azimuthal Angle-Dependent Color Change (Δu'v') of Liquid Crystal Panel

Figure 6:
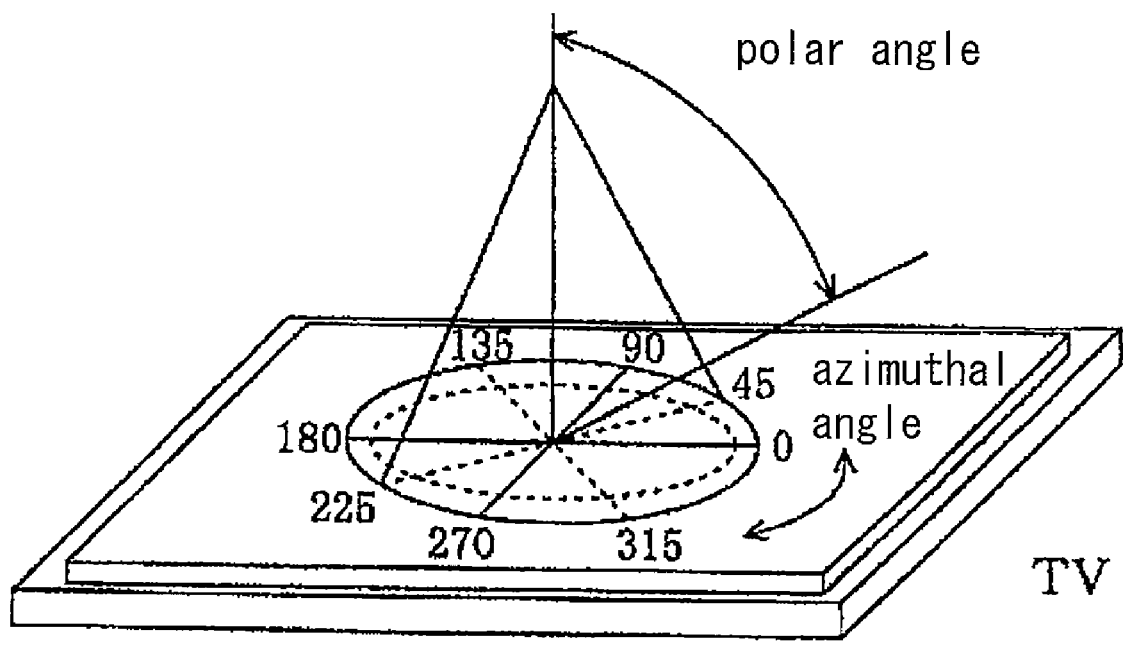
FIG. 6 is a schematic view showing the relationship between a polar angle and an azimuthal angle.

Color tones of a liquid crystal panel when viewed in the normal direction (i.e., from the front) and when an azimuth angle was varied from 0 to 360° with a polar angle being set to 60° were measured using "EZ CONTRAST 160D (trade name)" manufactured by ELDIM. The measurement results were plotted on an xy chromaticity diagram. With reference to the xy chromaticity diagram, the azimuthal angle-dependent color change (Δu'v') of the liquid crystal panel was determined based on the following equation (1). As the value of this Δu'v' becomes larger, it means the color shift is more significant. The azimuth angle and the polar angle are as shown in FIG. 6.

$$\Delta u'v' = \{(u'-u'i)^2 + (v'-v'i)^2\}^{1/2} \quad (1)$$

u': u' in the chromaticity (u',v') when the liquid crystal panel is observed in the normal direction (i.e., from the front)
v': v' in the chromaticity (u',v') when the liquid crystal panel is observed in the normal direction (i.e., from the front)
u'i: u'i in (u'i,v'i), which are points furthest from the (u',v') on the xy chromaticity diagram
v'i: v'i in (u'i,v'i), which are points furthest from the (u',v') on the xy chromaticity diagram (3) Contrast Ratio in the Front Direction of Liquid Crystal Display After a lapse of 30 minutes since the lighting of a backlight in a darkroom at 23° C., the Y value in a XYZ display system in the front direction was measured using "EZ CONTRAST160D (trade name)" manufactured by ELDIM when a white image was displayed and when a black image was displayed. Based on the Y value at the time of the white image display (YW: white luminance) and the Y value at the time of the black image display (YB: black luminance), the contrast ratio "YW/YB" was calculated.

(4) Knicks

After a lapse of 30 minutes since the lighting of the backlight in a darkroom at 23° C., the display surface at the time of black display was observed visually, and the presence or absence of knicks was determined based on the presence or absence of bright point.

A: No knicks were observed.
B: Although some knicks were observed, they were in a practically acceptable level.
C: Knicks were observed, which were in a practically unacceptable level.

[Polarizer]

Reference Example 1

A 75 μm thick polymer film containing a polyvinyl alcohol resin as a main component (Kuraray Co., Ltd., trade name "VFPS#7500") was immersed in five baths in the conditions described in [1] to [5] below with a tensile force being applied in the longitudinal direction of the film, whereby the film was stretched so that the final stretch ratio would be 6.2 times its original length. This stretched film was dried in an air circulation oven at 40° C. for 1 minute. Thus, a polarizer (A) was produced.

<Conditions>
[1] Swelling bath: pure water at 30° C.
[2] Dye bath: an aqueous solution at 30° C. containing 0.032 parts by weight of iodine with respect to 100 parts by weight of water and 0.2 parts by weight of potassium iodide with respect to 100 parts by weight of water
[3] First crosslinking bath: an aqueous solution at 40° C. containing 3 wt % potassium iodide and 3 wt % boric acid
[4] Second crosslinking bath: an aqueous solution at 60° C. containing 5 wt % potassium iodide and 4 wt % boric acid
[5] Washing bath: an aqueous solution at 25° C. containing 3 wt % potassium iodide Reference Example 2

A polarizer (B) was produced in the same manner and under the same conditions as in Reference Example 1, except that, in the dye bath, the added amount of iodine described in the condition [2] was set to 0.031 parts by weight with respect to 100 parts by weight of water.

Reference Example 3

A polarizer (C) was produced in the same manner and under the same conditions as in Reference Example 1, except that, in the dye bath, the added amount of iodine described in the condition [2] was set to 0.027 parts by weight with respect to 100 parts by weight of water.

[First Retardation Layer]

Reference Example 4

In a reaction vessel (500 ml) equipped with a mechanical stirrer, a Dean-Stark apparatus, a nitrogen inlet tube, a thermometer, and a cooling tube, 17.77 g (40 mmol) of 2,2'-bis (3,4-dicarboxyphenyl)hexafluoropropane dianhydride (Clariant (Japan) K.K.) and 12.81 g (40 mmol) of 2,2-bis (trifluoromethyl)-4,4'-diaminobiphenyl (Wakayama Seika Kogyo Co., Ltd.) were added. Subsequently, a solution obtained by dissolving 2.58 g (20 mmol) of isoquinoline in 257.21 g of m-cresol was added, and the mixture was stirred (600 rpm) for 1 hour at 23° C., thus obtaining a uniform solution. Then, the reaction vessel was heated using an oil bath so that the temperature inside the reaction vessel would be 180° C.±3° C. While maintaining the temperature, the solution was stirred for 5 hours, thus obtaining a yellow solution. The solution further was stirred for 3 hours. Thereafter, heating and stirring were stopped, and the mixture was allowed to stand to cool to the room temperature, whereby a polymer was deposited in the gel form.

Acetone was added to the yellow solution in the reaction vessel so as to dissolve the gel completely, thus producing a diluted solution (7 wt %). This diluted solution was added to 2 l of isopropyl alcohol gradually under stirring, and then white powder was deposited. This powder was filtered out and was put into 1.5 l of isopropyl alcohol for washing. The washing was completed by repeating the same operation once again, and thereafter, the powder was filtered out again. This was dried in an air circulation constant-temperature oven at 60° C. for 48 hours and then at 150° C. for 7 hours, thus obtaining polyimide powder represented by the above formula (III) with a yield of 85%. The weight-average molecular weight (Mw) of the polyimide was 124000 and the imidization ratio was 99.9%.

The polyimide powder was dissolved in methyl isobutyl ketone, thus preparing a 15 wt % polyimide solution. This polyimide solution was flow-expanded uniformly in a sheet-like shape on a surface of a triacetyl cellulose film (with a thickness of 80 μm) using a slot die coater. Then, the film was put in a multiple-chamber air circulation drying oven, and the solvent was evaporated by raising the temperature of the oven gradually from a low temperature, namely, at 80° C. for 2 minutes, at 135° C. for 5 minutes, and then at 150° C. for 10 minutes. Thus, a 3.7 μm thick laminate (C) including the polyimide layer and the triacetyl cellulose film was obtained. The refractive index ellipsoid of the laminate (C) had the relationship of nx=ny>nz (negative uniaxiality), and the laminate (C) satisfied: T[590]=90%, Re[590]=1 nm, Rth[590]=210 nm. Note here that optical characteristics of the laminate (C) at a portion where the polyimide layer is provided were Rth[590]=150 nm and $\Delta n_{xz}$=0.04.

[Second Retardation Layer]

Reference Example 5

A 100 μm thick polymer film containing a norbornene resin (OPTES INC., trade name "ZEONOR ZF14-100") was stretched 2.7 times in an air circulation constant-temperature oven at 150° C. by a fixed-end transverse uniaxial stretching method (a method in which the film is stretched in its width direction with the longitudinal direction of the film being fixed) using a tenter stretching machine. Thus, a retardation film (A) was obtained. The refractive index ellipsoid of this retardation film (A) had the relationship of nx>ny>nz (negative biaxiality). The retardation film (A) had a thickness of 35 μm and satisfied: T[590]=91%, Re[590]=120 nm, Rth[590]=160 nm, Nz coefficient at a wavelength of 590 nm=1.33, C[590]=5.1×10$^{12}$ m$^2$/N.

[Water-Soluble Adhesive Containing Polyvinyl Alcohol Resin and Metal Compound Colloid]

Reference Example 6

100 parts by weight of an acetoacetyl group-containing polyvinyl alcohol resin (Nippon Synthetic Chemical Industry Co., Ltd., trade name "GOHSEFIMER Z200", average polymerization degree: 1200, saponification degree: 98.5 mol %, acetoacetylation degree: 5 mol %) and 50 parts by weight of methylol melamine were dissolved in pure water under a temperature condition of 30° C., thus obtaining an aqueous solution whose solid content had been adjusted to 3.7%. With respect to 100 parts by weight of this aqueous solution, 18 parts by weight of alumina colloid aqueous solution (average particle diameter: 15 nm, solid content: 10%, positively charged) was added, thus preparing a water-soluble adhesive. The water-soluble adhesive had a viscosity of 9.6 mPa·s and a pH of 4 to 4.5.

[Liquid Crystal Cell]

Reference Example 7

A liquid crystal panel was taken out from a commercially available liquid crystal display (Sony Corp., 32-inch liquid crystal television, trade name "BRAVIA S2500 32") including a VA mode liquid crystal cell, and optical films, such as polarizing plates, arranged on the upper and lower sides of the liquid crystal cell were all removed. Then, both sides of a glass plate of this liquid crystal cell were washed. Thus, a liquid crystal cell (A) was obtained.

Reference Example 8

A liquid crystal panel was taken out from a commercially available liquid crystal display (Sharp Corporation, 32-inch liquid crystal television, trade name "AQUOS") including a VA mode liquid crystal cell, and optical films, such as polarizing plates, arranged on the upper and lower sides of the liquid crystal cell were all removed. Then, both sides of a glass plate of this liquid crystal cell were washed. Thus, a liquid crystal cell (B) was obtained.

Example 1

(Production of First Polarizing Plate)

To each surface of the polarizer (A) of Reference Example 1, an 80 μm thick cellulose resin-containing polymer film (Fuji Photo Film Co., Ltd., trade name "TD80UF") was attached via a polyvinyl alcohol resin-containing water-soluble adhesive (Nippon Synthetic Chemical Industry Co., Ltd., trade name "GOHSEFIMER Z200"). Thus, a polarizing plate (A1) was produced.

(Production of Retardation Layer-Provided Second Polarizing Plate)

On one side of the polarizer (B) of Reference Example 2, the retardation film (A) of Reference Example 5 was attached via the water-soluble adhesive in such a manner that the slow axis of the retardation film (A) became orthogonal to the absorption axis of the polarizer (B). Then, on the opposite side of the retardation film (A), the laminate (C) of Reference Example 4 was attached via the water-soluble adhesive in such a manner that the triacetylcellulose film side of the laminate (C) faced the retardation film (A). Finally, on the opposite side of the polarizer (B), an 80 μm thick cellulose resin-containing polymer film (Fuji Photo Film Co., Ltd., trade name "TD80UF") was attached via the water-soluble adhesive. Thus, a retardation layer-provided polarizing plate (B1) was produced.

(Production of Liquid Crystal Panel and Liquid Crystal Display)

On the visible side of the liquid crystal cell (A) of Reference Example 7, the polarizing plate (A1) was attached via an acrylic pressure-sensitive adhesive (thickness: 20 μm) in such a manner that the absorption axis direction of the polarizing plate (A1) became parallel to the long-side direction of the liquid crystal cell (A). Then, on the backlight side of the liquid crystal cell (A), the retardation layer-provided polarizing plate (B1) was attached via an acrylic pressure-sensitive adhesive (thickness: 20 μm) in such a manner that the laminate (C) side thereof became the liquid crystal cell (A) side and the absorption axis direction of the retardation layer-provided polarizing plate (B1) became orthogonal to the long-side direction of the liquid crystal cell (A). Thus, a liquid crystal panel (A) was obtained. The liquid crystal panel (A) then was bonded to a backlight unit included in the original liquid crystal display, thus producing a liquid crystal display (A). Main components of the liquid crystal panel (A) are shown in the following Table 1. In the following Table 1, the upper side corresponds to the visible side of the liquid crystal panel and the lower side corresponds the backlight side of the of the liquid crystal panel. The same applies to the following Table 2.

Example 2

(Production of First Polarizing Plate)

A polarizing plate (A1) was produced in the same manner as that for the first polarizing plate of Example 1.

(Production of Retardation Layer-Provided Second Polarizing Plate)

A retardation layer-provided polarizing plate (B1) was produced in the same manner as that for the retardation layer-provided second polarizing plate of Example 1.

(Production of Liquid Crystal Panel and Liquid Crystal Display)

A liquid crystal panel (B) and a liquid crystal display (B) were produced in the same manner as that for the liquid crystal panel and the liquid crystal display of Example 1, except that the liquid crystal cell (B) of Reference Example 8 was used instead of the liquid crystal cell (A) of Reference Example 7. Main components of the liquid crystal panel (B) are shown in the following Table 1.

Example 3

(Production of First Polarizing Plate)

A polarizing plate (A1) was produced in the same manner as that for the first polarizing plate of Example 1.

(Production of Retardation Layer-Provided Second Polarizing Plate)

A retardation layer-provided polarizing plate (C1) was produced in the same manner as that for the retardation layer-provided second polarizing plate of Example 1, except that the polarizer (C) of Reference Example 3 was used instead of the polarizer (B) of Reference Example 2.

(Production of Liquid Crystal Panel and Liquid Crystal Display)

A liquid crystal panel (C) and a liquid crystal display (C) were produced in the same manner as that for the liquid crystal panel and the liquid crystal display of Example 1, except that the retardation layer-provided polarizing plate (C1) was used instead of the retardation layer-provided polarizing plate (B1). Main components of the liquid crystal panel (C) are shown in the following Table 1.

Example 4

(Production of First Polarizing Plate)

A polarizing plate (B2) was produced in the same manner as that for the first polarizing plate of Example 1, except that the polarizer (B) of Reference Example 2 was used instead of the polarizer (A) of Reference Example 1.

(Production of Retardation Layer-Provided Second Polarizing Plate)

A retardation layer-provided polarizing plate (A2) was produced in the same manner as that for the retardation layer-provided second polarizing plate of Example 1, except that the polarizer (A) of Reference Example 1 was used instead of the polarizer (B) of Reference Example 2.

(Production of Liquid Crystal Panel and Liquid Crystal Display)

A liquid crystal panel (D) and a liquid crystal display (D) were produced in the same manner as that for the liquid crystal panel and the liquid crystal display of Example 1, except that the polarizing plate (B2) was used instead of the polarizing plate (A1) and the retardation layer-provided polarizing plate (A2) was used instead of the retardation layer-provided polarizing plate (B1). Main components of the liquid crystal panel (D) are shown in the following Table 1.

Example 5

(Production of First Polarizing Plate)

A polarizing plate (C2) was produced in the same manner as that for the first polarizing plate of Example 1, except that the polarizer (C) of Reference Example 3 was used instead of the polarizer (A) of Reference Example 1.

(Production of Retardation Layer-Provided Second Polarizing Plate)

A retardation layer-provided polarizing plate (A2) was produced in the same manner as that for the retardation layer-provided second polarizing plate of Example 4.

(Production of Liquid Crystal Panel and Liquid Crystal Display)

A liquid crystal panel (E) and a liquid crystal display (E) were produced in the same manner as that for the liquid crystal panel and the liquid crystal display of Example 1, except that the polarizing plate (C2) was used instead of the polarizing plate (A1) and the retardation layer-provided polarizing plate (A2) was used instead of the retardation layer-provided polarizing plate (B1). Main components of the liquid crystal panel (E) are shown in the following Table 1.

Example 6

(Production of First Polarizing Plate)

A polarizing plate (A1) was produced in the same manner as that for the first polarizing plate of Example 1.

(Production of Retardation Layer-Provided Second Polarizing Plate)

A retardation layer-provided polarizing plate (A2) was produced in the same manner as that for the retardation layer-provided second polarizing plate of Example 4.

(Production of Liquid Crystal Panel and Liquid Crystal Display)

A liquid crystal panel (F) and a liquid crystal display (F) were produced in the same manner as that for the liquid crystal panel and the liquid crystal display of Example 1, except that the polarizing plate (A2) with a retardation layer was used instead of the polarizing plate (B1) with a retardation layer. Main components of the liquid crystal panel (F) are shown in the following Table 1.

Example 7

(Production of First Polarizing Plate)

A polarizing plate (A1) was produced in the same manner as that for the first polarizing plate of Example 1.

(Production of Retardation Layer-Provided Second Polarizing Plate)

On one side of the polarizer (B) of Reference Example 2, the retardation film (A) of Reference Example 5 was attached via the water-soluble adhesive of Reference Example 6 in such a manner that the slow axis of the retardation film (A) became orthogonal to the absorption axis of the polarizer (B). Then, on the opposite side of the retardation film (A), the laminate (C) of Reference Example 4 was attached via a polyvinyl alcohol resin-containing water-soluble adhesive (Nippon Synthetic Chemical Industry Co., Ltd., trade name "GOHSEFIMER Z200") in such a manner that the triacetyl-cellulose film side of the laminate (C) faced the retardation film (A). Finally, on the opposite side of the polarizer (B), an 80 μm thick cellulose resin-containing polymer film (Fuji Photo Film Co., Ltd., trade name "TD80UF") was attached via a polyvinyl alcohol resin-containing water-soluble adhesive (Nippon Synthetic Chemical Industry Co., Ltd., trade name "GOHSEFIMER Z200"). Thus, a retardation layer-provided polarizing plate (B3) was produced.

(Production of Liquid Crystal Panel and Liquid Crystal Display)

A liquid crystal panel (G) and a liquid crystal display (G) were produced in the same manner as that for the liquid crystal panel and the liquid crystal display of Example 1, except that the retardation layer-provided polarizing plate (B3) was used instead of the retardation layer-provided polarizing plate (B1). Main components of the liquid crystal panel (G) are shown in the following Table 1.

Example 8

(Production of First Polarizing Plate)

A polarizing plate (A1) was produced in the same manner as that for the first polarizing plate of Example 1.

(Production of Retardation Layer-Provided Second Polarizing Plate)

The retardation layer-provided polarizing plate (B3) was produced in the same manner as that for the retardation layer-provided second polarizing plate of Example 7.

(Production of Liquid Crystal Panel and Liquid Crystal Display)

A liquid crystal panel (H) and a liquid crystal display (H) were produced in the same manner as that for the liquid crystal panel and the liquid crystal display of Example 1, except that the liquid crystal cell (B) of Reference Example 8 was used instead of the liquid crystal cell (A) of Reference Example 7 and the retardation layer-provided polarizing plate (B3) was used instead of the retardation layer-provided polarizing plate (B1). Main components of the liquid crystal panel (H) are shown in the following Table 1.

Example 9

(Production of First Polarizing Plate)

A polarizing plate (A1) was produced in the same manner as that for the first polarizing plate of Example 1.

(Production of Retardation Layer-Provided Second Polarizing Plate)

A retardation layer-provided polarizing plate (C3) was produced in the same manner as that for retardation layer-provided second polarizing plate of Example 7, except that the polarizer (C) of Reference Example 3 was used instead of the polarizer (B) of Reference Example 2.

(Production of Liquid Crystal Panel and Liquid Crystal Display)

A liquid crystal panel (I) and a liquid crystal display (I) were produced in the same manner as that for the liquid crystal panel and the liquid crystal display of Example 1, except that the retardation layer-provided polarizing plate (C3) was used instead of the retardation layer-provided polarizing plate (B1). Main components of the liquid crystal panel (I) are shown in the following Table 1.

Example 10

(Production of First Polarizing Plate)

A polarizing plate (B2) was produced in the same manner as that for the first polarizing plate of Example 4.

(Production of Retardation Layer-Provided Second Polarizing Plate)

A retardation layer-provided polarizing plate (A3) was produced in the same manner as that for the retardation layer-provided second polarizing plate of Example 7, except that the polarizer (A) of Reference Example 1 was used instead of the polarizer (B) of Reference Example 2.

(Production of Liquid Crystal Panel and Liquid Crystal Display)

A liquid crystal panel (J) and a liquid crystal display (J) were produced in the same manner as that for the liquid crystal panel and the liquid crystal display of Example 1, except that the polarizing plate (B2) was used instead of the polarizing plate (A1) and the retardation layer-provided polarizing plate (A3) was used instead of the retardation layer-provided polarizing plate (B1). Main components of the liquid crystal panel (J) are shown in the following Table 1.

Example 11

(Production of First Polarizing Plate)

A polarizing plate (C2) was produced in the same manner as that for the first polarizing plate of Example 5.

(Production of Retardation Layer-Provided Second Polarizing Plate)

A retardation layer-provided polarizing plate (A3) was produced in the same manner as that for the retardation layer-provided second polarizing plate of Example 10.

(Production of Liquid Crystal Panel and Liquid Crystal Display)

A liquid crystal panel (K) and a liquid crystal display (K) were produced in the same manner as that for the liquid crystal panel and the liquid crystal display of Example 1, except that the polarizing plate (C2) was used instead of the polarizing plate (A1) and the retardation layer-provided polarizing plate (A3) was used instead of the retardation layer-provided polarizing plate (B1). Main components of the liquid crystal panel (K) are shown in the following Table 1.

Example 12

(Production of First Polarizing Plate)

A polarizing plate (A1) was produced in the same manner as that for the first polarizing plate of Example 1.

(Production of Retardation Layer-Provided Second Polarizing Plate)

A retardation layer-provided polarizing plate (A3) was produced in the same manner as that for the retardation layer-provided second polarizing plate of Example 10.

(Production of Liquid Crystal Panel and Liquid Crystal Display)

A liquid crystal panel (L) and a liquid crystal display (L) were produced in the same manner as that for the liquid crystal panel and the liquid crystal display of Example 1, except that the retardation layer-provided polarizing plate (A3) was used instead of the retardation layer-provided polarizing plate (B1). Main components of the liquid crystal panel (L) are shown in the following Table 1.

Comparative Example 1

(Production of Retardation Layer-Provided First Polarizing Plate)

On one side of the polarizer (A) of Reference Example 1, the retardation film (A) of Reference Example 5 was attached via a polyvinyl alcohol resin-containing water-soluble adhesive (Nippon Synthetic Chemical Industry Co., Ltd., trade name "GOHSEFIMER Z200") in such a manner that the slow axis of the retardation film (A) became orthogonal to the absorption axis of the polarizer (A). Then, on the opposite side of the polarizer (A), an 80 μm thick cellulose resin-containing polymer film (Fuji Photo Film Co., Ltd., trade name "TD80UF") was attached via the water-soluble adhesive. Thus, a retardation layer-provided polarizing plate (A4) was produced.

(Production of Retardation Layer-Provided Second Polarizing Plate)

On one side of the polarizer (B) of Reference Example 2, the laminate (C) of Reference Example 4 was attached via the above-described water-soluble adhesive in such a manner that the triacetylcellulose film side of the laminate (C) faced the polarizer (B). Then, on the opposite side of the polarizer (B), an 80 μm thick cellulose resin-containing polymer film (Fuji Photo Film Co., Ltd., trade name "TD80UF") was attached via the water-soluble adhesive. Thus, a retardation layer-provided polarizing plate (B4) was produced.

(Production of Liquid Crystal Panel and Liquid Crystal Display)

On the visible side of the liquid crystal cell (A) of Reference Example 7, the retardation layer-provided polarizing plate (A4) was attached via an acrylic pressure-sensitive adhesive (thickness: 20 μm) in such a manner that the retardation film (A) side became the liquid crystal cell (A) side and the absorption axis direction of the retardation layer-provided polarizing plate (A4) became parallel to the long-side direction of the liquid crystal cell (A). Then, on the backlight side of the liquid crystal cell (A), the retardation layer-provided polarizing plate (B4) was attached via an acrylic pressure-sensitive adhesive (thickness: 20 μm) in such a manner that the laminate (C) side became the liquid crystal cell (A) side and the absorption axis direction of the retardation layer-provided polarizing plate (B4) became orthogonal to the long-side direction of the liquid crystal cell (A). Thus, a liquid crystal panel (M) was obtained. The liquid crystal panel (M) then was bonded to a backlight unit included in the original liquid crystal display, thus producing a liquid crystal display (M). Main components of the liquid crystal panel (M) are shown in the following Table 2.

Comparative Example 2

(Production of Retardation Layer-Provided First Polarizing Plate)

A retardation layer-provided polarizing plate (A4) was produced in the same manner as that for the retardation layer-provided first polarizing plate according to Comparative Example 1.

(Production of Retardation Layer-Provided Second Polarizing Plate)

A retardation layer-provided polarizing plate (B4) was produced in the same manner as that for the retardation layer-provided second polarizing plate according to Comparative Example 1.

(Production of Liquid Crystal Panel and Liquid Crystal Display)

A liquid crystal panel (N) and a liquid crystal display (N) were produced in the same manner as that for the liquid crystal panel and the liquid crystal display of Comparative Example 1, except that the liquid crystal cell (B) of Reference Example 8 was used instead of the liquid crystal cell (A) of Reference Example 7. Main components of the liquid crystal panel (N) are shown in the following Table 2.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| Liquid crystal panel | A | B | C | D | E | F | G | H | I | J | K | L |
| First polarizer | A | A | A | B | C | A | A | A | A | B | C | A |
| Liquid crystal cell | A | B | A | A | A | A | A | B | A | A | A | A |
| First retardation layer | C | C | C | C | C | C | C | C | C | C | C | C |
| Second retardation layer | A | A | A | A | A | A | A | A | A | A | A | A |
| Second polarizer | B | B | C | A | A | A | B | B | C | A | A | A |
| Metal compound fine particles | none | none | none | none | none | none | present | present | present | present | present | present |

TABLE 2

|  | Comp. Ex. 1 | Comp. Ex. 2 |
|---|---|---|
| Liquid crystal panel | M | N |
| First polarizer | A | A |
| Retardation layer | A | A |
| Liquid crystal cell | A | B |
| Retardation layer | C | C |
| Second polarizer | B | B |
| Metal compound fine particles | none | none |

With regard to the respective examples and the comparative examples, Table 3 shows the results of the measurement of the azimuthal angle-dependent color change (Δu'v') of the liquid crystal panels, the results of the measurement of the contrast ratio in the front direction of the liquid crystal displays, and the results of the evaluation of knicks.

TABLE 3

| | First polarizer | $T_1$ (%) | Liquid crystal cell | Second polarizer | $T_2$ (%) | Azimuthal angle-dependent color change of liquid crystal panel ($\Delta u'v'$) | Contrast ratio of liquid crystal display in front direction | Evaluation of knicks |
|---|---|---|---|---|---|---|---|---|
| Ex. 1 | A | 41.5 | A | B | 42.6 | 0.055 | 2218 | B |
| Ex. 2 | A | 41.5 | B | B | 42.6 | 0.059 | 1613 | B |
| Ex. 3 | A | 41.5 | A | C | 43.5 | 0.059 | 2121 | B |
| Ex. 4 | B | 42.6 | A | A | 41.5 | 0.056 | 2011 | B |
| Ex. 5 | C | 43.5 | A | A | 41.5 | 0.061 | 1997 | B |
| Ex. 6 | A | 41.5 | A | A | 41.5 | 0.052 | 2020 | B |
| Ex. 7 | A | 41.5 | A | B | 42.6 | 0.055 | 2218 | A |
| Ex. 8 | A | 41.5 | B | B | 42.6 | 0.059 | 1613 | A |
| Ex. 9 | A | 41.5 | A | C | 43.5 | 0.059 | 2121 | A |
| Ex. 10 | B | 42.6 | A | A | 41.5 | 0.056 | 2011 | A |
| Ex. 11 | C | 43.5 | A | A | 41.5 | 0.061 | 1997 | A |
| Ex. 12 | A | 41.5 | A | A | 41.5 | 0.052 | 2020 | A |
| Comp. Ex. 1 | A | 41.5 | A | B | 42.6 | 0.067 | 2213 | B |
| Comp. Ex. 2 | A | 41.5 | B | B | 42.6 | 0.069 | 1597 | B |

As can be seen from Tables 1 to 3, comparing the examples and comparative examples in which the same liquid crystal cell was used, it was found that, for example, in Examples 1 and 7 and Comparative Example 1, Examples 1 and 7 in which the first retardation layer (the laminate (C)) and the second retardation layer (the retardation film (A)) were arranged between the liquid crystal cell and the second polarizer (i.e., on the backlight side of the liquid crystal cell) showed smaller azimuthal angle-dependent color changes ($\Delta u'v'$) of the liquid crystal panels and thus exhibited superior optical characteristics in practical use. Similarly, in Examples 2 and 8 and Comparative Example 2, Examples 2 and 8 showed smaller azimuthal angle-dependent color changes ($\Delta u'v'$) of the liquid crystal panels and thus exhibited superior optical characteristics in practical use. Furthermore, comparing the examples and comparative examples in which the same liquid crystal cell (A) was used, Examples 1, 3, 7, and 9 in which the transmittance ($T_2$) of the second polarizer (the polarizer on the backlight side) was greater than the transmittance ($T_1$) of the first polarizer (the polarizer on the visible side) showed smaller azimuthal angle-dependent color changes ($\Delta u'v'$) of the liquid crystal panels and larger contrast ratios in the front direction and thus exhibited superior optical characteristics in practical use. In contrast, in Examples 4, 5, 10, and 11 in which the transmittance ($T_1$) of the first polarizer (the polarizer on the visible side) was greater than the transmittance ($T_2$) of the second polarizer (the polarizer on the backlight side) and in Examples 6 and 12 in which the transmittance ($T_1$) of the first polarizer (the polarizer on the visible side) was equal to the transmittance ($T_2$) of second polarizer (the polarizer on the backlight side), slight decrease in the contrast ratio in the front direction was observed, although it was in a practically acceptable level. Furthermore, although the result of evaluation of knicks was B in Examples 1 to 6 and Comparative Examples 1 and 2, the result of evaluation of knicks was A in Examples 7 to 12 in which the water-soluble adhesive containing the polyvinyl alcohol resin and the metal compound colloid was used in lamination of the second polarizer and the second retardation layer.

INDUSTRIAL APPLICABILITY

As described above, the liquid crystal panel of the present invention can provide a neutral display that is free from coloring in every direction. Examples of the use of the liquid crystal panel of the present invention and the liquid crystal display using the same include: office automation equipment such as desktop computers, notebook computers, and copy machines; portable devices such as mobile phones, watches, digital cameras, personal digital assistants (PDAs), and portable game devices; household electric appliances such as video cameras, televisions, and microwave ovens; vehicle-mounted devices such as back monitors, car navigation systems monitors, and car audios; exhibition devices such as information monitors for commercial stores; security devices such as surveillance monitors; and nursing care and medical devices such as nursing-care monitors and medical monitors. There is no limitation on the use of the liquid crystal panel and the liquid crystal display of the present invention, and they are applicable to a wide range of fields.

The invention claimed is:

1. A liquid crystal panel comprising:
   a liquid crystal cell;
   a first polarizer arranged on a visible side of the liquid crystal cell;
   a second polarizer arranged on a backlight side of the liquid crystal cell; and
   a first retardation layer and a second retardation layer arranged between the liquid crystal cell and the second polarizer, wherein:
   a refractive index ellipsoid of the first retardation layer has a relationship of nx=ny>nz,
   a refractive index ellipsoid of the second retardation layer has a relationship of nx>ny≧nz, and
   a transmittance ($T_2$) of the second polarizer is greater than a transmittance ($T_1$) of the first polarizer.

2. The liquid crystal panel according to claim 1, wherein, a difference ($\Delta T = T_2 - T_1$) between the transmittance ($T_2$) of the second polarizer and the transmittance ($T_1$) of the first polarizer is in a range from 0.1% to 6.0%.

3. The liquid crystal panel according to claim 1, wherein the transmittance ($T_1$) of the first polarizer is in a range from 38.3% to 43.3%, and the transmittance ($T_2$) of the second polarizer is in a range from 41.1% to 44.3%.

4. The liquid crystal panel according to claim 1, wherein a polarization ratio of at least one of the first polarizer and the second polarizer is at least 99%.

5. The liquid crystal panel according to claim 1, wherein at least one of the first polarizer and the second polarizer contains a polyvinyl alcohol resin containing iodine.

6. The liquid crystal panel according to claim 5, wherein a difference ($\Delta I = I_1 - I_2$) between an iodine content ($I_1$) in the first polarizer and an iodine content ($I_2$) in the second polarizer is in a range from 0.1 to 2.6 wt %.

7. The liquid crystal panel according to claim 5, wherein at least one of the iodine content ($I_1$) in the first polarizer and the iodine content ($I_2$) in the second polarizer is in a range from 1.8 to 5.0 wt %.

8. The liquid crystal panel according to claim 1, wherein a slow axis of the second retardation layer is orthogonal to an absorption axis of the first polarizer.

9. The liquid crystal panel according to claim 1, wherein the first retardation layer and the second retardation layer are arranged in this order from the visible side toward the backlight side.

10. The liquid crystal panel according to claim 9, wherein, in lamination of the second polarizer and the second retardation layer, the second polarizer and the second retardation layer are laminated via an adhesive layer.

11. The liquid crystal panel according to claim 10, wherein the adhesive layer contains a water-soluble adhesive containing a polyvinyl alcohol resin.

12. The liquid crystal panel according to claim 11, wherein the water-soluble adhesive containing the polyvinyl alcohol resin further contains a metal compound colloid.

13. The liquid crystal panel according to claim 1, wherein a retardation value ($Rth_1[590]$) of the first retardation layer in a thickness direction at a wavelength of 590 nm is in a range from 100 to 400 nm.

14. The liquid crystal panel according to claim 1, wherein the first retardation layer is any one of a retardation film (B1) containing a polyimide resin, a retardation film (B2) containing a cellulose resin, and a laminate (C) of the retardation film (B1) and the retardation film (B2).

15. The liquid crystal panel according to claim 1, wherein a retardation value ($Re_1[590]$) within a plane of the first retardation layer at a wavelength of 590 nm is in a range from 50 to 200 nm.

16. The liquid crystal panel according to claim 1, wherein the second retardation layer is a retardation film (A) containing a norbornene resin.

17. The liquid crystal panel according to claim 1, wherein the liquid crystal cell contains a liquid crystal molecule that is in homeotropic alignment.

18. A liquid crystal display comprising a liquid crystal panel, wherein the liquid crystal panel is the liquid crystal panel according to claim 1.

* * * * *